US005833799A

United States Patent [19]
Mittleider

[11] Patent Number: 5,833,799
[45] Date of Patent: Nov. 10, 1998

[54] ARTICULATED WELDING SKATE

[75] Inventor: John A. Mittleider, Kent, Wash.

[73] Assignee: The Boeing Company, Seattle, Wash.

[21] Appl. No.: 912,158

[22] Filed: Aug. 15, 1997

Related U.S. Application Data

[62] Division of Ser. No. 788,552, Jan. 24, 1997, which is a division of Ser. No. 352,991, Dec. 9, 1994, Pat. No. 5,660,669.

[51] Int. Cl.$^6$ .................................................. B32B 31/00
[52] U.S. Cl. ...................... 156/379.7; 156/497; 156/498; 219/634; 219/657
[58] Field of Search ............................. 156/379.6, 379.7, 156/380.2, 380.6, 272.4, 274.4, 274.6, 497, 498, 499, 282, 285; 219/633, 634, 657, 658

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,379,829 | 3/1945 | Pedlow et al. . |
| 2,423,922 | 7/1947 | Arndt, Jr. . |
| 2,589,777 | 3/1952 | Collins . |
| 2,761,941 | 9/1956 | Ardichvili . |
| 2,898,435 | 8/1959 | Crafts . |
| 3,061,503 | 10/1962 | Gould et al. . |
| 3,101,403 | 8/1963 | Lewis et al. . |
| 3,183,460 | 5/1965 | Bennon . |
| 3,288,979 | 11/1966 | Mills et al. . |

(List continued on next page.)

FOREIGN PATENT DOCUMENTS

| | | |
|---|---|---|
| 0 228 719 | 7/1987 | European Pat. Off. . |
| 0 461 979 B1 | 4/1994 | European Pat. Off. . |
| 54-25542 | 2/1979 | Japan . |
| 58-059039 | 4/1983 | Japan . |
| 988492 | 1/1983 | Russian Federation . |

OTHER PUBLICATIONS

J. Giachino, Welding Skills and Practices, Am. Tech. Soc., Chicago, IL (1960, 1965, 1967, 1971, 1976) 393–401.

*Primary Examiner*—Michael W. Ball
*Assistant Examiner*—Michael A. Tolin
*Attorney, Agent, or Firm*—John C Hammar

[57] ABSTRACT

An apparatus for thermoplastic welding together by fusion bonding an assembly of composite parts, each having a resin-rich thermoplastic surface layer, along bond lines containing a conductive susceptor includes a weld skate that can be moved along guiding and supporting tooling over the bond line to effect the weld. The skate has an induction work coil and two pressure pads, one on each side of the coil in its direction of motion in operation, for applying pressure to the parts while said induction work coil induces eddy currents in the susceptor to heat the susceptor by resistive heating and melt the thermoplastic surface layers. The skate has bearings projecting from its side into cam grooves machined into the sides of the tooling for guiding and supporting the skate during welding by the induction work coil. The tooling, which supports the parts during welding as well as guiding the skate, includes several sets of spaced-apart parallel plates forming between them a slot dimensioned to receive the skate while the skate is supported and guided by engagement of the projecting bearings into the cam grooves, and the forces exerted by the skate pressure pads on the parts are reacted through the tooling by the projecting bearings in the tooling cam grooves. A floor assembly jig includes a box frame having end and intermediate support structures for supporting the tooling parallel to the plane of the box frame. The skate is coupled to a motive means having a servomotor and a loop of chain trained around two spaced sprockets for moving the skate at a controlled speed along the tooling over the susceptors in the bond line while the inductive work coil generates eddy currents in the susceptor to heat the thermoplastic in the bond line, and the pressure pads press the parts together to facilitate fusion bonding of the faying thermoplastic surface layers on the parts.

9 Claims, 25 Drawing Sheets

U.S. PATENT DOCUMENTS

| | | |
|---|---|---|
| 3,395,261 | 7/1968 | Leatherman et al. . |
| 3,427,421 | 2/1969 | Matheson et al. . |
| 3,431,379 | 3/1969 | Yrene . |
| 3,450,856 | 6/1969 | Buck et al. . |
| 3,492,453 | 1/1970 | Hurst . |
| 3,507,735 | 4/1970 | Chisholm . |
| 3,571,550 | 3/1971 | Rose et al. . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,067,765 | 1/1978 | Heller, Jr. et al. . |
| 4,091,254 | 5/1978 | Struve . |
| 4,120,712 | 10/1978 | Sindt . |
| 4,180,717 | 12/1979 | Lenk et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,445,951 | 5/1984 | Lind et al. . |
| 4,489,123 | 12/1984 | Schijve et al. . |
| 4,521,659 | 6/1985 | Buckley et al. . |
| 4,541,891 | 9/1985 | Leatherman . |
| 4,642,155 | 2/1987 | Ramsey . |
| 4,653,396 | 3/1987 | Wennerberg . |
| 4,671,470 | 6/1987 | Jonas . |
| 4,673,450 | 6/1987 | Burke . |
| 4,684,417 | 8/1987 | Grandclement . |
| 4,714,808 | 12/1987 | Brolin . |
| 4,752,350 | 6/1988 | Schuster . |
| 4,768,433 | 9/1988 | Boissevain . |
| 4,791,260 | 12/1988 | Waldman . |
| 4,822,972 | 4/1989 | Sugioka et al. . |
| 4,841,113 | 6/1989 | Hamada et al. . |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,971,639 | 11/1990 | Quinn et al. . |
| 4,978,825 | 12/1990 | Schmidt et al. . |
| 5,001,319 | 3/1991 | Holmstrom . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |
| 5,396,050 | 3/1995 | Ebihara et al. . |
| 5,444,220 | 8/1995 | Hansen et al. . |
| 5,486,684 | 1/1996 | Peterson et al. . |

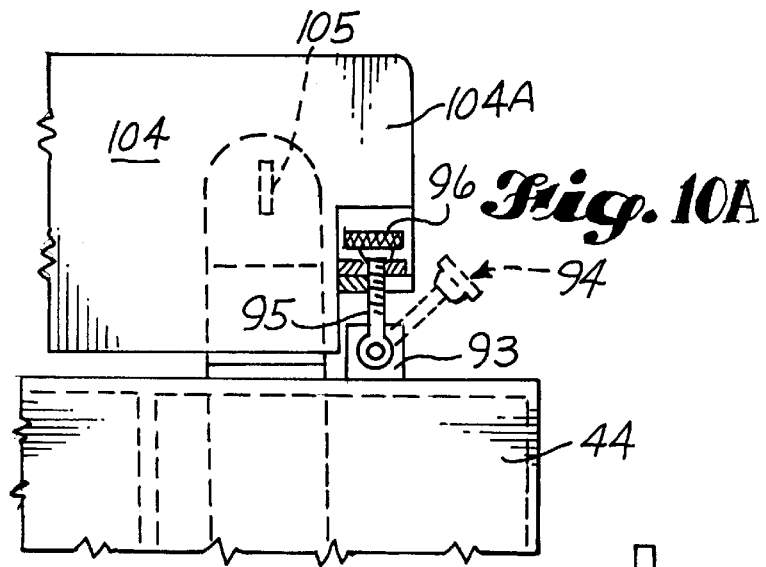
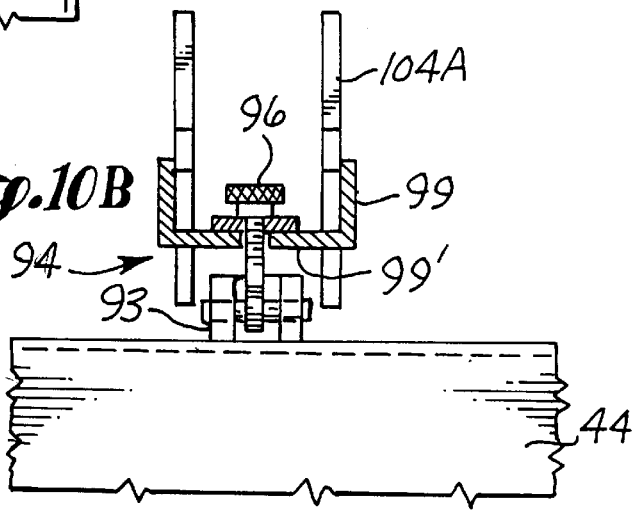
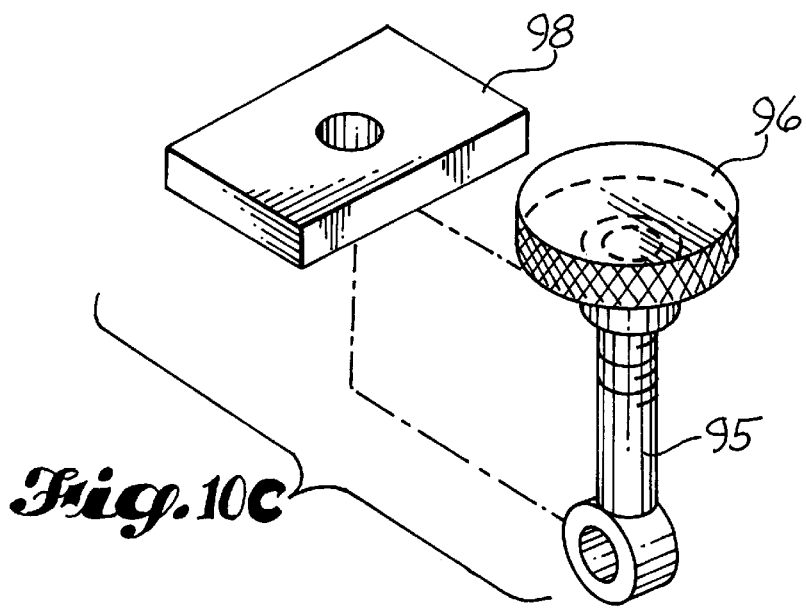

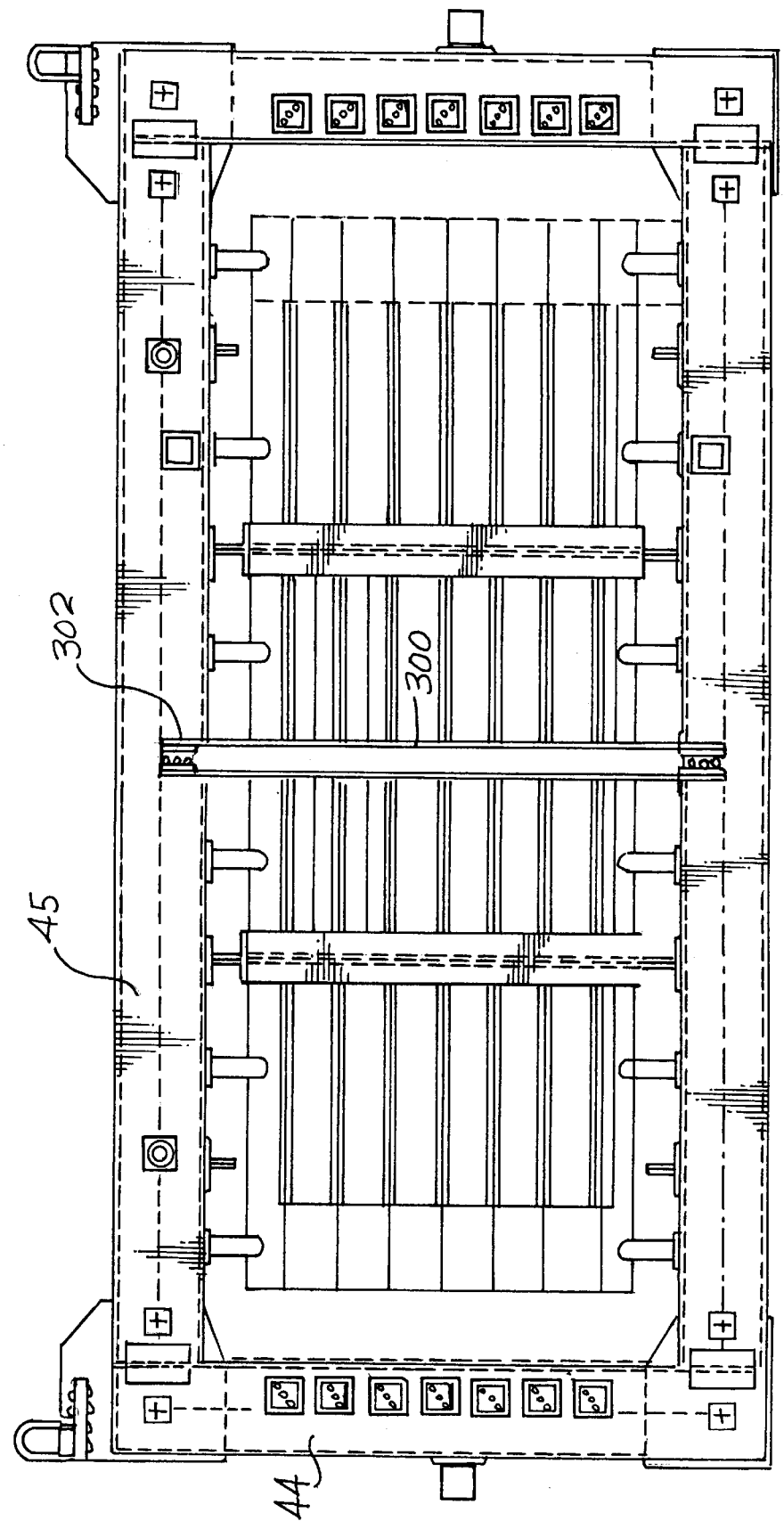

ARTICULATED WELDING SKATE

REFERENCE TO RELATED APPLICATIONS

The present invention is a divisional application based upon U.S. patent application Ser. No. 08/788,552, filed Jan. 24, 1997, which was a divisional application based upon U.S. patent application Ser. No. 08/352,991, filed Dec. 9, 1994, now U.S. Pat. No. 5,660,669.

TECHNICAL FIELD

This invention relates to an articulated welding skate for fusion bonding of thermoplastic materials, and more particularly to methods of induction welding and apparatus for generating heat and pressure in the bond line between two thermoplastic parts for fusion bonding the parts together, wherein the source of heat is resistive heating of a susceptor in the bond line with eddy currents magnetically induced by an induction coil.

BACKGROUND OF THE INVENTION

Thermoplastic welding is a process by which plastic parts are fusion bonded together to form an integral part. As used herein, the term "plastic parts" includes composite thermoplastic parts, and thermoset composite parts with resin rich thermoplastic surface layers. This process offers considerable promise as a manufacturing technique because it eliminates the need for fasteners which are traditionally used to fasten parts together into assemblies. The installation of fasteners is a expensive and time consuming process and potentially weakens the structure because of the holes necessarily drilled into the structure for installation of the fasteners. Without special care to harden or reinforce the peripheral regions around these holes, they can serve as the origination points for stress cracking and can also be instrumental in the beginning of corrosion problems and leaks. Parts which are fastened together by conventional fasteners in the aerospace industry in particular must often have a sealant applied not only to the fastener holes but also to the faying surfaces of the parts between the fasteners to seal the faying surfaces against leakage of water from the outside and against loss of air pressure from the inside, in the case of a pressurized hull. Aircraft wing boxes which double as fuel tanks in aircraft must also be carefully sealed to prevent leakage of fuel from the wing box, even when the wing box flexes in operation as wing boxes are normally designed to do, and to prevent arcing from metal fasteners.

Thermoplastic welding involves the application of heat to the plastic parts to raise the temperature of the faying surfaces to the temperature at which the thermoplastic can melt and flow together. For most applications, and in particular for structural applications, it is preferably to concentrate the heat application at the bond line to avoid heating the entire structure. Heating an entire structure made of thermoplastic composites is disadvantageous because it can cause the structure to lose its rigidity and its shape, and possibly incur some delamination, unless complicated tooling is provided to support the structure against sagging under temperatures close to its melting point. One technique for applying heat directly to the faying surfaces of plastic parts to raise the temperature to the melting point for fusion bonding is with induction heating. Electrically conductive materials can be heated resistively by small scale eddy currents in the material induced by an alternating magnetic field generated by an induction coil. A foraminous metallic bond line susceptor is one known material receptive to the induction of eddy currents under the influence of an induction coil.

A fusion bond between two plastic parts is inherently uninspectable by known methods of non-destructive testing. The fusion zone is buried between the two parts and the only reliable method for determining whether the parts are completely bonded is to cut the bonded parts into sections and subject the sections to destructive tensile testing. Other techniques which are non-destructive, such as ultrasonic echo analysis, are effective for discovering gaps in the faying surfaces, but when unbonded surfaces are in contact, the ultrasonic echo techniques may not reveal the existence of an unbonded zone.

The traditional approach in manufacturing for dealing with uninspectable product regions is to develop a process for producing products which are extensively tested to destruction to empirically establish the process limits within which the process yields acceptable products. Then, with rigid process controls and periodic confirmation testing, confidence is established in the integrity of the process even though the assemblies that are produced by the process cannot be non-destructively tested to confirm that the process is producing the desired products. Basically, the theory is that if the assembly is produced within the same range of significant production parameters used to produce the earlier assemblies which yielded acceptable test results, any product variation between the tested product and the later untested products will have already been shown to be insignificant.

In the case of thermoplastic fusion bonding, the significant process parameters include the pressure exerted on the parts, the thickness and material characteristics of the top part, the speed at which the coil is moved over the bond line, the surface fit of the faying surfaces of the two parts, the power and frequency applied to the coil, the temperature and dwell time at temperature at the bond line, and the separation between the coil and the bond line. These process parameters are typically difficult to control to the precision desired for accurate process control and are also particularly difficult to record and correlate with the zone tested on the parts after the process has been performed. For example, after the parts are sectioned and subjected to tensile tests, it would be useful to correlate the regions of incomplete welding with the process parameters at that particular zone when the process was being performed. In this way, a map can be established corresponding to the faying surfaces of the parts describing the process parameters in affect at each point along the faying surface. Problem areas can then be identified and the process parameters at those problems areas can be analyzed in detail for process improvement. Afterward, after the process is perfected, a permanent record can be established for each part showing the process parameters in effect at every point along each of the bond lines in the assembly so that a complete manufacturing record can be created for each assembly as required by certain regulatory regimes in the manufacture of flight critical hardware.

Thus, there is a need in the developing art of thermoplastic bonding of parts into large scale assemblies for a method and apparatus for reliably and repeatably performing an inductive welding process within a fixed range of process parameters and for affording the possibility of sensing and recording the process parameters for statistical process control and as a manufacturing record of the parts produced.

SUMMARY OF THE INVENTION

Accordingly, the present invention provides an improved thermoplastic welding apparatus for fusion bonding of two thermoplastic parts which produces highly repeatable process parameters for each weld along the manufactured assembly. The invention also provides an improved automated welding apparatus that automatically operates in accordance with the prescribed process parameters to produce repeatable results for each bond line. In a preferred embodiment, the invention provides an improved thermoplastic welding apparatus that yields a record of the process parameters correlated to the linear position of the weld along each bond line. The preferred process for fusion bonding of plastic parts uses induction heating of a susceptor at the bond line and simultaneous pressure using low friction pressure pads acting on the upper surface of the top part to press the faying surfaces of the two parts into firm contact for fusion bonding. Still another feature involves of fusion bonding of thermoplastic surfaces of composite parts in which pressure is exerted on the top part to bring the two faying surfaces into firm contact and the pressure is exerted with an air bearing which simultaneously cools the parts to prevent excessive heating of the parts to their softening temperature.

The invention uses a thermoplastic welding apparatus having tooling supported on a floor assembly jig for guiding and supporting an articulated weld skate over a bond line aligned with the tooling. An induction work coil is mounted on the skate between two pressure pads having air bearing faces for transferring pressure from the tooling through the pressure pads to the parts. The air pumped through the air bearing helps to cool the parts to avoid overall heating of the part to the softening temperature. A motive device attached to the skate draws the skate through the tooling at a controlled and reproducible rate. Sensors in the system produce signals indicative of the process parameters and the position along the bond line, and a recording device records the data stream to produce a permanent record of the process parameters correlated to their position along the bond line.

DESCRIPTION OF THE DRAWINGS

The invention and its many attendant objects and advantages will become better understood upon reading the following detailed description of the preferred embodiment in conjunction with the following drawings, wherein;

FIG. 10A is a side elevation of a portion of the apparatus shown in FIG. 10, showing the header clamp in clamping position;

FIG. 10B is an end elevation of the header clamp shown in FIG. 10A;

FIG. 10C is a perspective view of the header clamp rod and thumb nut of the header clamp shown in FIG. 10A;

FIG. 24 is a plan view of the FAJ box frame with the tooling in the rib welding configuration.

DESCRIPTION OF THE PREFERRED EMBODIMENT

Figure 1:
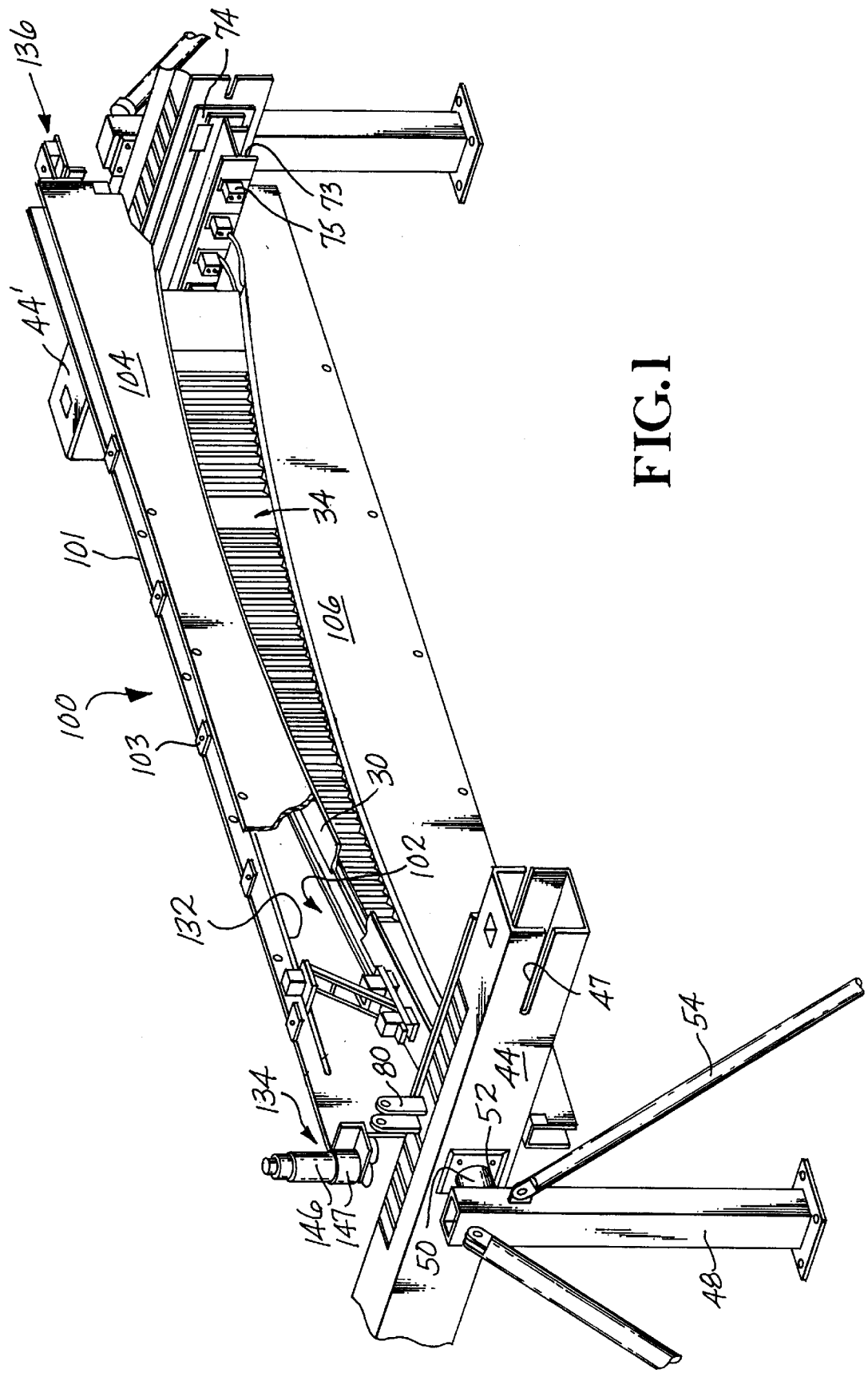
FIG. 1 is a perspective view of a welding apparatus in accordance with this invention showing one spar and a broken-away section of upper and lower wing skin, and one set of headers supporting the spar and wing skins.

Turning now to the drawings wherein like reference characters designate identical or corresponding parts, an apparatus is shown in FIG. 1 for welding by fusion bonding a plurality of composite parts, having thermoplastic or other heat activated material faying surfaces, together into an integral assembly, such as a wing box shown.

The apparatus is shown in FIG. 1 in the horizontal position and will be described using orientation terms referenced to this horizontal position. Notwithstanding this horizontal frame of reference, the apparatus may be operated in the vertical position and indeed is designed to be rotated to and used in the vertical position, as illustrated in FIG. 2, as will be described below, so the horizontal frame of reference used to describe the relative orientation and position of the parts should be understood as provided merely for clarity of description rather than in any limiting sense.

The preferred embodiment of the apparatus and the process of fusion bonding parts will be described for manufacturing an airplane wing box 28. The wing box 28 has an upper skin 30, a lower skin 32, a plurality of spars 34, and a plurality of ribs 36 extending between the spars at spaced locations therealong. The spars 34 are made of thermoplastic composite material such as Klll-B polyimide available from DuPont. Each spar includes an upper spar cap and a lower spar cap connected by a vertical web formed in a generally sinewave planform. The spars 34 are formed using a process disclosed in a patent application entitled "Sinewave Web I-Beam" filed by Douglas McCarville. The ribs 36 are formed of the same material and each also includes upper and lower rib caps joined by a straight rather than sine wave planform vertical web. The spars 34 run lengthwise along the wing and the ribs 36 run spanwise between the spars. The wing box 28 formed by the upper and lower skins 30 and 32, the spars 34 and the ribs 36 forms the structural core of the aircraft wing, and also doubles as a fuel tank for the aircraft. This preferred embodiment is merely an example of a type of structure which the apparatus and method of this invention are capable producing; thus it should be understood that the invention is intended to be suitable for manufacturing a wide variety of other integral assemblies by fusion bonding.

The process of welding the upper and lower skins 30 and 32 to the spars 34 and the ribs 36 will be described in detail below, but a summary of the process is as follows: the parts to be welded together are assembled with a resin-encapsulated foraminous conductive susceptor 38 between the faying surfaces. In the case of the wing box 28, this involves attaching the susceptor 38 to the outer surfaces of the spar caps and rib caps and then sandwiching the spars and ribs between the wing skins 30 and 32. The parts are held in position and squeezed together while an induction work coil is pulled along the intended bond line over the outer surface of the two wing skins in alignment with the susceptors 38. The coil produces an alternating magnetic field which projects through the wing skins and around the susceptor, generating eddy currents in the susceptor. The magnetic field is strong enough to produce eddy currents of sufficient amperage to heat the susceptor by dielectric heating, raising the temperature of the thermoplastic material in the faying surfaces to its melting temperature. The molten thermoplastic material from the faying surfaces of the two facing parts flows in and around the interstices of the foraminous susceptor and fuses together, thereby creating a fusion bond.

Figure 2:
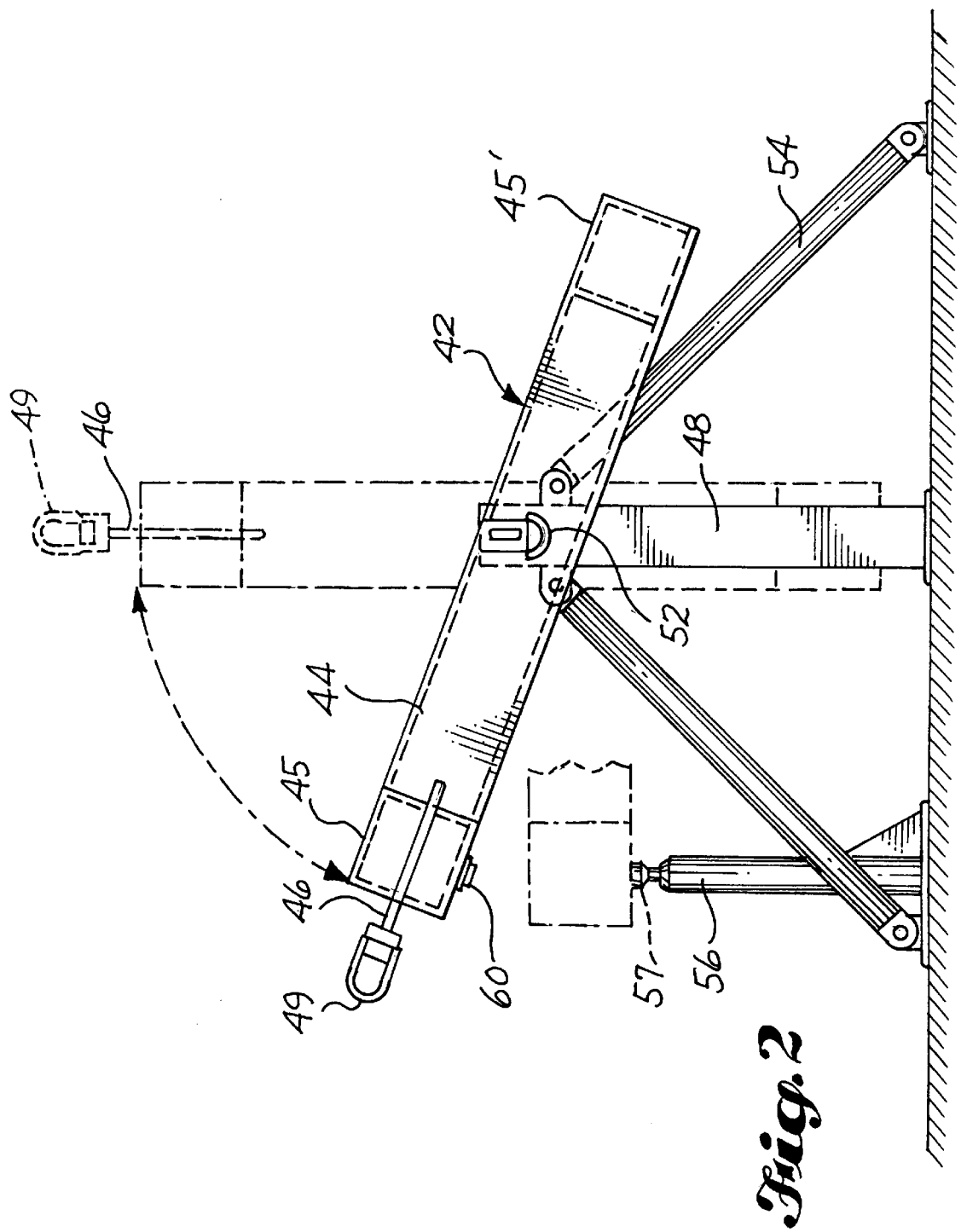
FIG. 2 is an end elevation of the apparatus shown in FIG. 1, showing the rotational support for the box frame of the welding apparatus.
Figure 3:
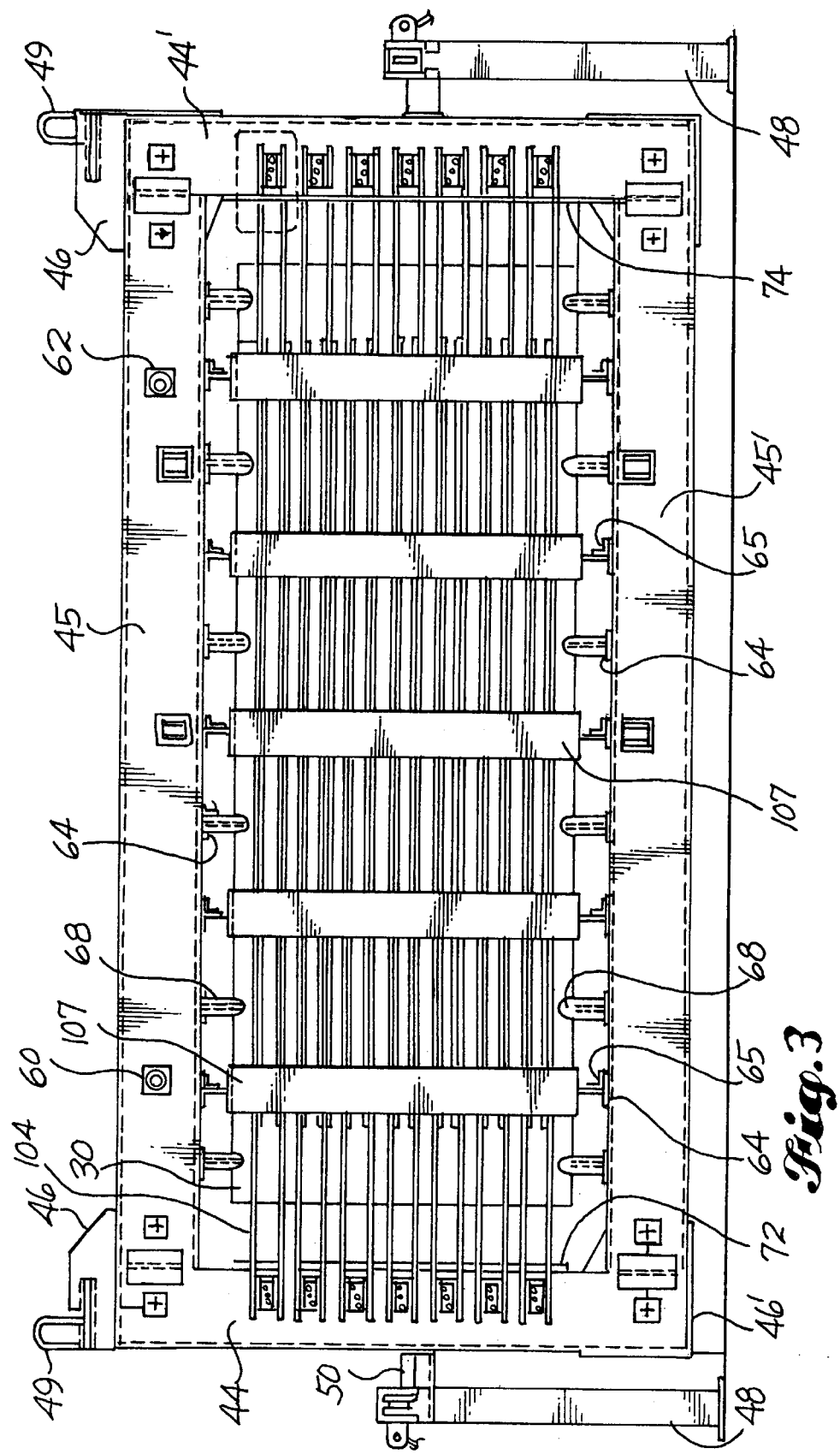
FIG. 3 is a side elevation of the apparatus shown in FIG. 2, with the box frame in the vertical position.

The apparatus for performing the welding process includes a floor assembly jig 40, commonly referred to as an FAJ, shown in FIGS. 2 and 3, having a rectangular box frame 42 having two end tube members 44 and 44', and two longitudinal tube members 45 and 45' made of rectangular steel tubing welded together at their ends to form a is rigid frame from which tooling of various designs can be supported. A horizontal slot 47 is cut into the ends of each tube member into which a corner gusset plate 46 and 46' is inserted, spanning each corner, and is welded in place to provide additional rigidity for the box frame 42. A clevis ring 49 is pinned to each corner gusset plate 46 for carrying the FAJ 40 by overhead crane: and to provide an attachment point for other purposes, to be described below.

The tubing dimensions for the FAJ 40 are chosen for the size of the largest article that will be manufactured on the apparatus. The wing box 28 to be made on the disclosed FAJ 40 is about fourteen feet long and box frame is about 20'×12' to provide space for various fittings, to be described. The tubing selected for an FAJ of this size is one half inch thick and about 12" by 12" in cross section. The FAJ box frame 42 is supported midway along its two narrow ends on the end tube members 44 and 44' by a pair of pedestal supports 48 which engage a pair of tubular pintles 50 fastened to and projecting from the mid-point of the end tube members 44.

The pintles 50 are each cradled in a semi-cylindrical gudgeon 52 attached to the pedestal supports 48, each of which in turn is braced in its vertical position by three diagonal braces 54 as shown in FIG. 1. The height of the pedestal supports 48 is slightly longer than ½ the length of the end tubes 44 and 44' of the box frame 42 to allow the box frame 42 to be rotated from the horizontal position shown in FIG. 1 to the vertical position shown in phantom in FIG. 2 in which position the welding is performed, and then may be flipped entirely over to an inverted position for further processing to be described below.

Supplemental legs 56 have ball ends 57 that are received in sockets 60 and 62 fastened to one of the longitudinal tube members 45 top and bottom to support the box frame 42 in either of its horizontal positions while the tooling and parts are being installed. The ball ends 57 are attached to threaded shanks received in threaded receptacles in the top ends of the legs 56 which enable the legs 56 to be adjusted to a desired length to support the frame in its horizontal position. At that position, the frame can be secured to floor anchors by nylon straps or the like attached to the clevis ring 49 to tie it down against the legs 56 to hold it in a cantilevered horizontal position.

Figure 4:
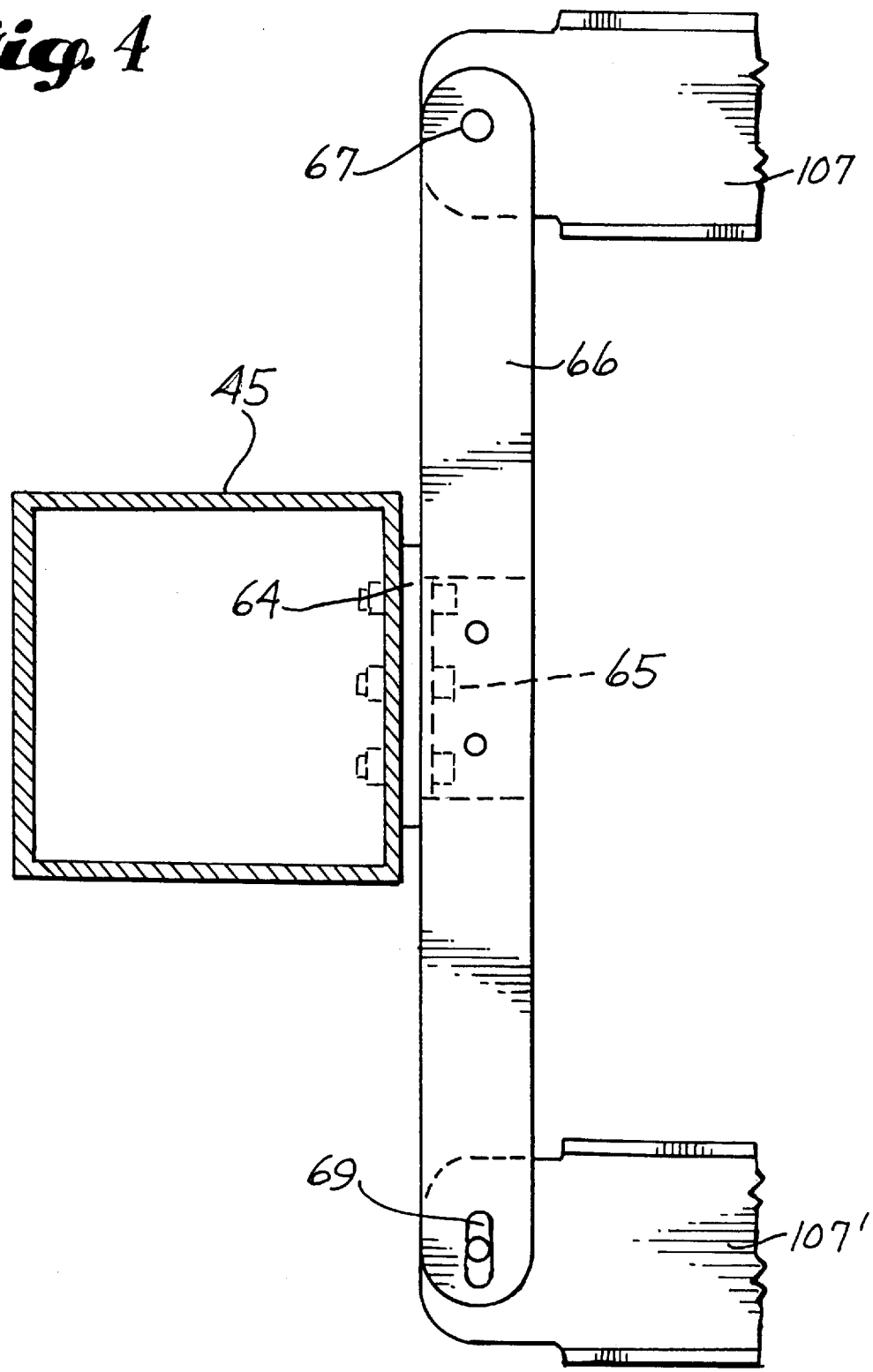
FIG. 4 is a sectional end elevation through one of the longitudinal tubular frame members, showing the connection of a lateral tie bar to the tube.
Figure 5:
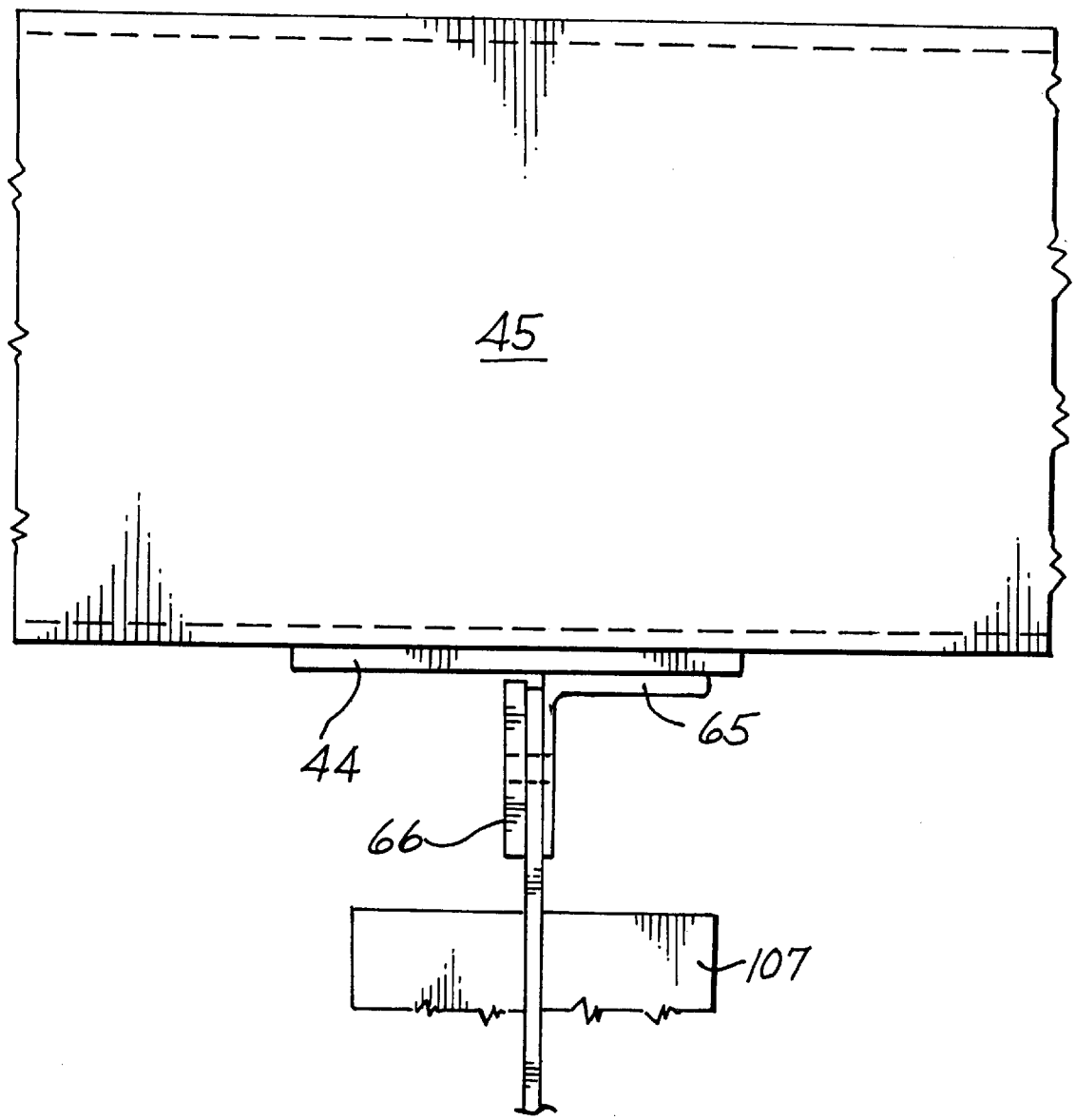
FIG. 5 is a plan view of the structure shown in FIG. 4.
Figure 6:
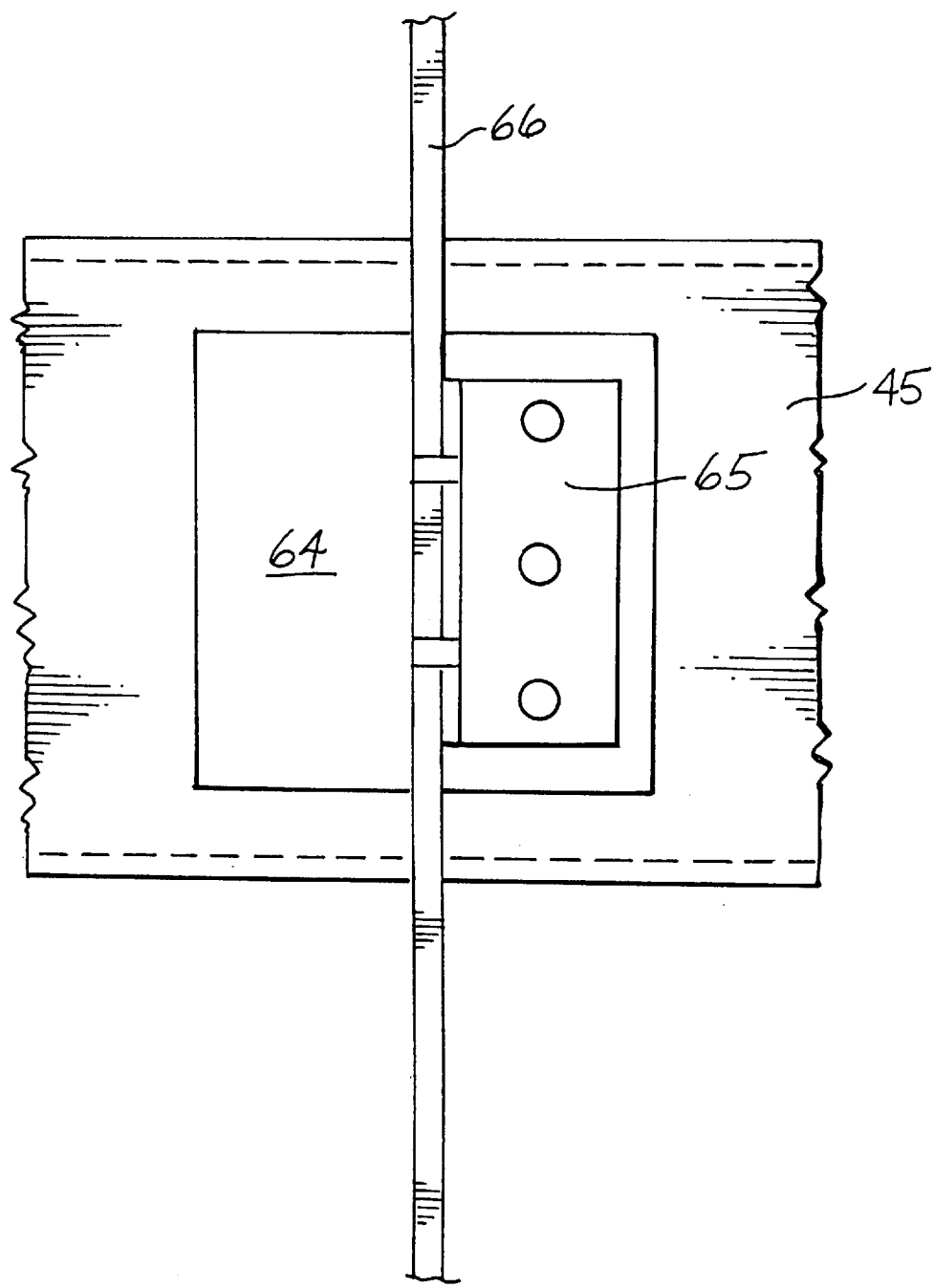
FIG. 6 is a side elevation of the structure shown in FIG. 5.

As shown in FIGS. 3–6, a series of connector plates 64 is fastened, as by welding, to the inside surface of the longitudinal tube members 45 and 45' of the box frame 42. The connector plates 64 are welded to precision machined surfaces on the inside faces of the tube members 45 and 45' and are themselves machined flat to provide precision reference surfaces for attachment of the fittings to be attached to the box frame 42. Connector brackets 65, shown in FIGS. 4–6, are attached to the FAJ 40 with bolts threaded into tapped holes in the connector plates 64 and provide a connection for a series of lateral tie bars 66, and also for a series of panel support brackets 68 which provide edge support and precision position indexing for the wing skins 30 and 32. An intermediate tube member (not shown) can be attached to the tubes 45 and 45' on opposite sides of the FAJ 40 at any selected position therealong for shortening the effective length of the work zone in the box frame 42 when shorter assemblies are to be manufactured in the apparatus.

Figure 10:
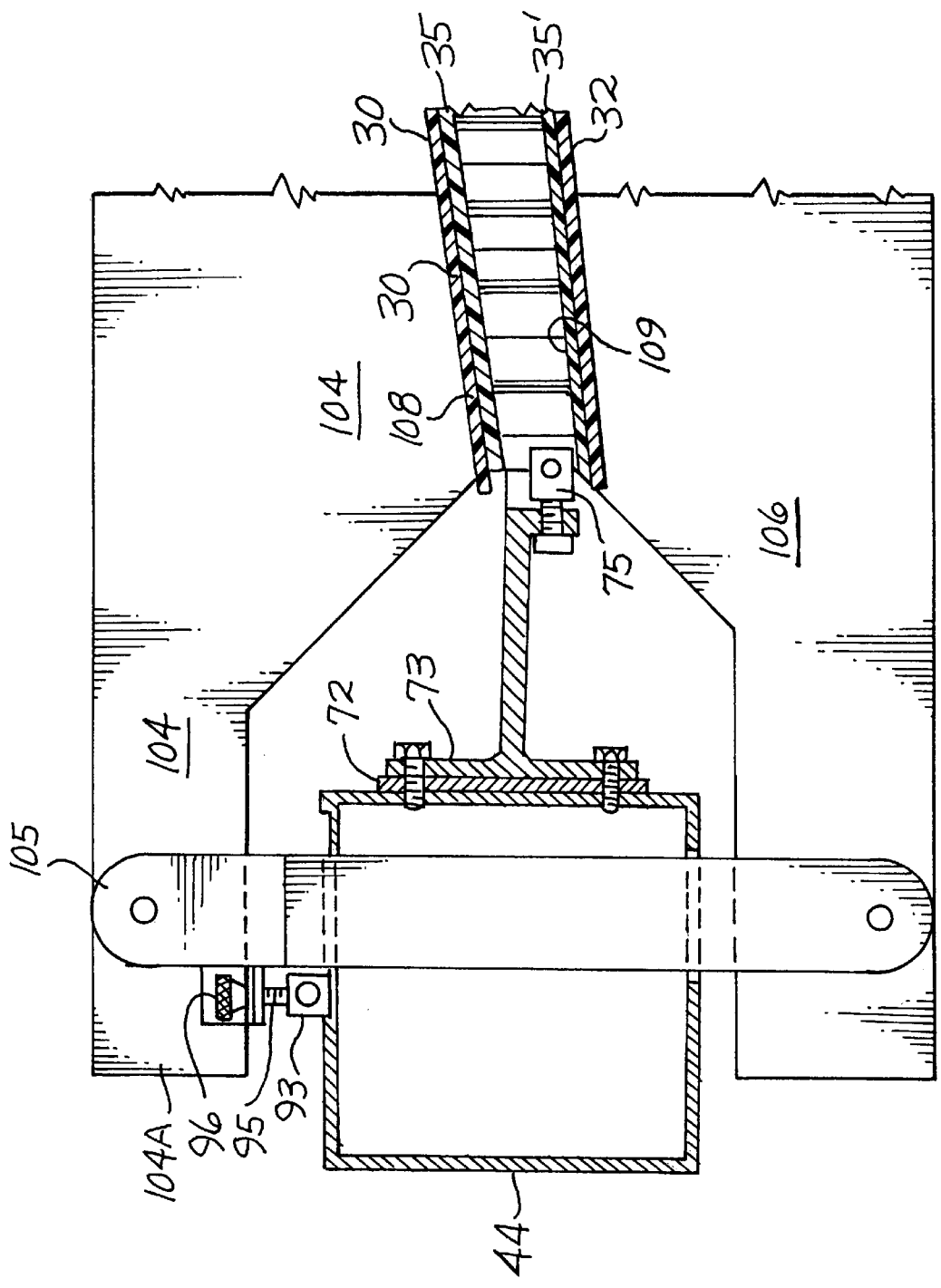
FIG. 10 is a side elevation along lines 10—10 in FIG. 8.

End connector plates 72 and 74 are attached, as by welding or other suitable attachment methods, to the inside faces of the end tubes 44 and 44', respectively. A block support beam 73 is bolted to each end connector plate 72 and 74 and supports a series of spaced spar support blocks 75 connected by bolts that pass through the blocks and the flanges of the block support beam 73. The ends of the spars 34 are clamped to the sides of the spar support blocks 75 during assembly, as will be described below. The top inner flange of the block support beam 73 is removed at the end of the FAJ 40 adjacent the short end of the spar as shown in FIG. 10 to provide clearance for the part support tooling 100, to be described below. Attachment zones 76 and 78 are machined into the top and bottom surfaces of the end tube members 44 and 44' to provide precision flat surfaces to which attachment mounts 84 are attached for holding a series of end spreader bars 80 and 82 in a series of spaced elongated slots 77 machined through the attachment zones 76 and 78 in the end tube members 44 and 44', respectively.

Turning now to FIGS. 7–11, the end spreader bars 80 are shown mounted in the slots 77 in the upper and lower attachment zones 76 and 76' in the end tubes 44 and 44'. The support for the spreader bars 82 at the other end of the FAJ 40 is identical so it will not be separately described. Each pair of spreader bars 80 is vertically supported on the tube member 44 by the channel section attachment mount 84, shown most clearly in FIGS. 7 and 9, to which the spreader bars 80 are bolted in pairs. Each attachment mount 84 includes a flat base 86 and two spaced upstanding legs 88 to which the spreader bars 80 and 82 are connected by machine screws 90 threaded into a pair of tapped holes 92 in the spreader bars 80 and 82. The tapped holes 92 in the spreader bars 80 and 82 permit them to be supported vertically without transferring the load to the FAJ 40 That is, the load exerted by one set of headers (to be described below) carried by the spreader bars 80 and 82 is transferred through the spreader bars to the other set of headers without loading the FAJ 40.

Figure 7:
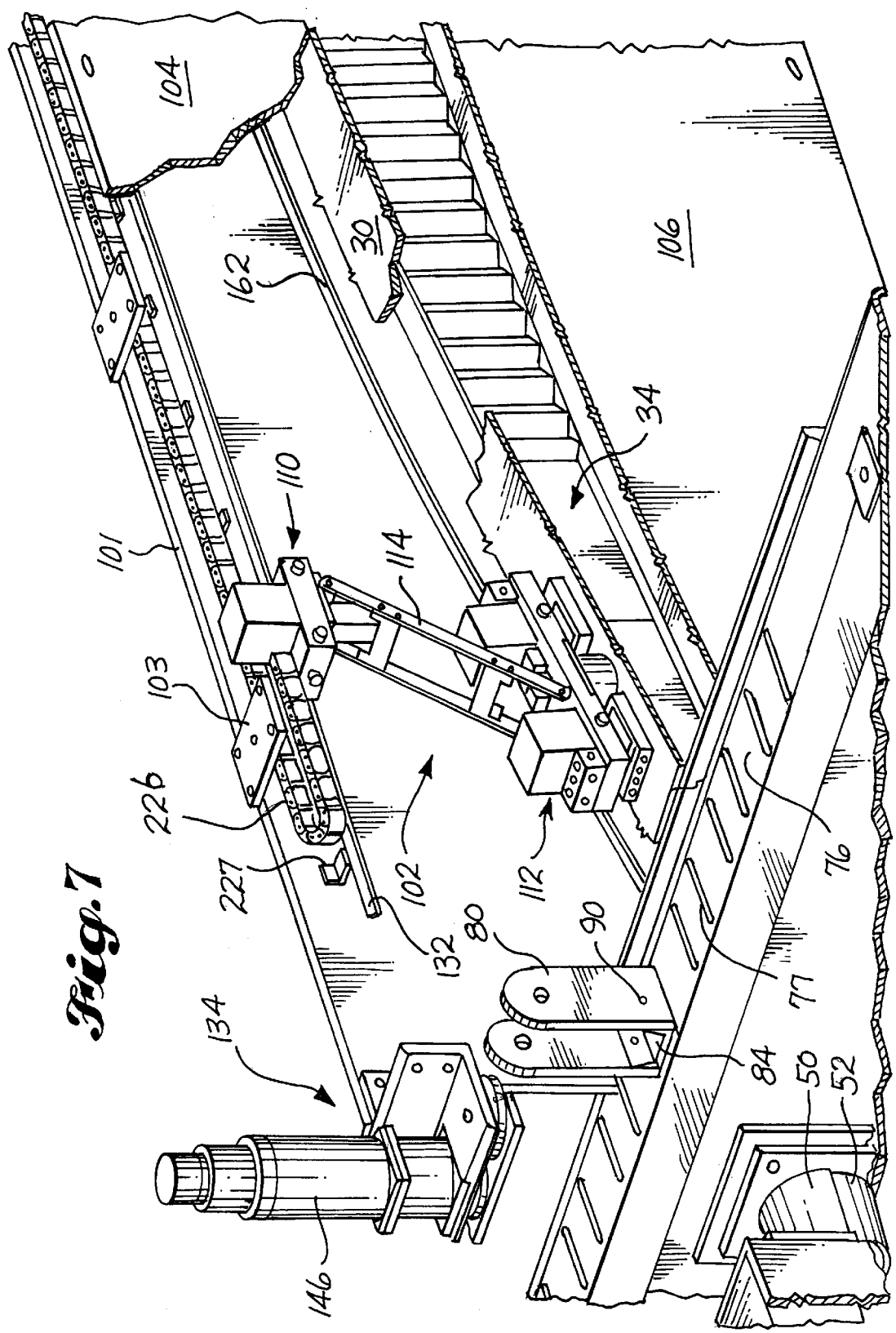
FIG. 7 is an enlarged perspective view of the left hand portion of the apparatus shown in FIG. 1.
Figure 8:
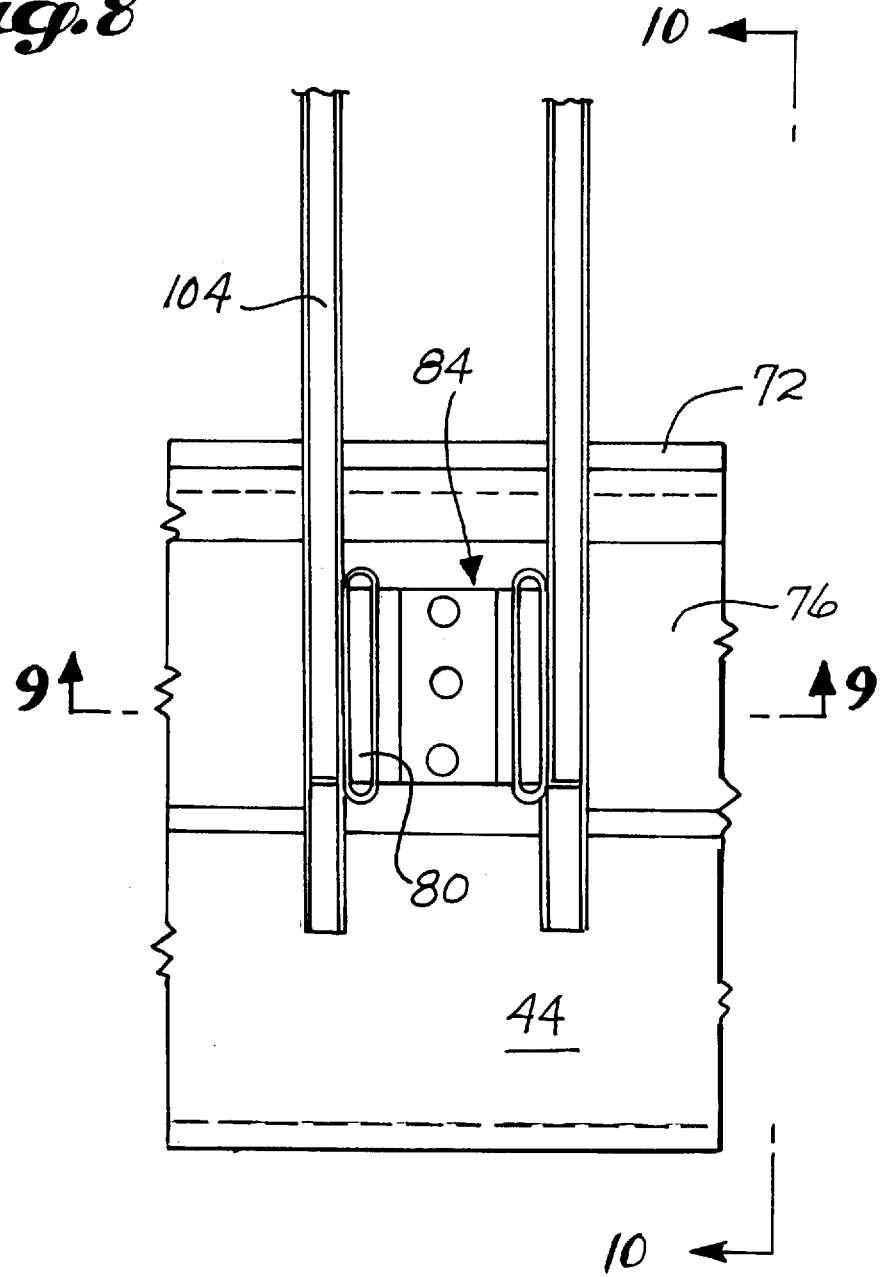
FIG. 8 is a plan view of a region of the end tube of the box frame showing the spreader bars holding a pair of headers.
Figure 11:
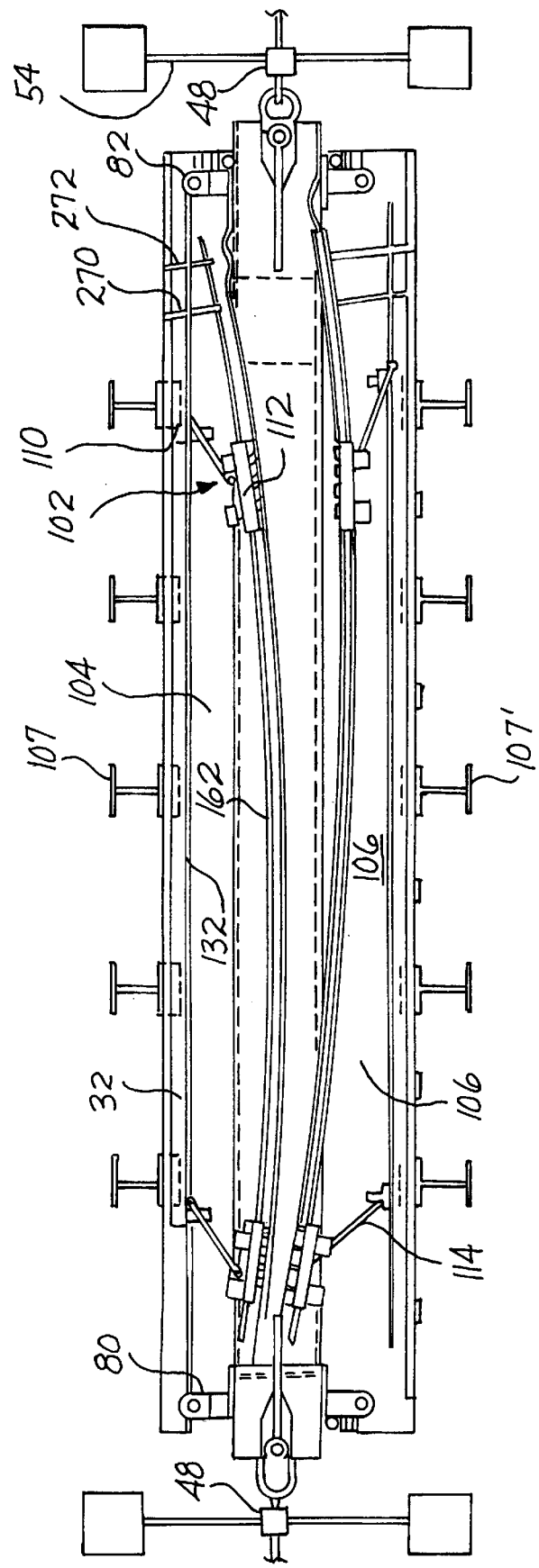
FIG. 11 is a plan view of the apparatus shown in FIG. 3, with the top longitudinal tube member of the box frame and the top header removed for clarity of illustration of the weld skates in several positions.

The FAJ 40 supports tooling 100 used to support the plastic parts, namely the wing skins 30 and 32, the spars 34, and the ribs 36 that will be welded together to form the wing box 38, and also to support and guide a weld skate 102 which exerts pressure on the wing skin and generates an alternating magnetic field to perform the induction welding operation. As shown in FIGS. 1, 3 and 7, the tooling 100 includes a plurality of parallel upper headers 104 arranged and connected together in pairs at their straight edges 101 by connector bars 103, and a matching series of lower headers 106 similarly connected together in pairs. The upper headers 104 and lower headers 106 are attached and supported at their ends to opposite ends of the spreader bars 80 and 82, which hold the headers in spaced parallel relationship, and are supported vertically at spaced positions intermediate their ends by support beams 107, as shown in FIG. 11, attached to opposite ends of the lateral tie bars 66 as shown in FIG. 4.

As shown in FIG. 10, the headers 104 on the top side are bolted to the spreader bars 80 and 82 through elongated holes 105 in the top of the spreader bars 80 and 82 which allow the headers to be tightened against the wing box 38 during the welding operation by header clamps 94, shown in FIGS. 10A–10C. The header clamp 94 includes a clamp block 93 bolted to the top of the end tube members 44 and 44' on the centerline between the headers 104. A threaded rod 95 is pivotally connected at its lower end to the clamp block 93 and receives an internally threaded thumb nut 96 having a lower shoulder 97. An apertured plate 98 fits on the pivoted rod 95 and bears against inwardly projecting legs 99' of a pair of angles 99 fastened to projecting end portions 104A of the headers 104. When the clamp is in the vertical clamping position shown in solid lines in FIG. 10A, the thumb nut 96 can be screwed down on the rod 95, exerting force with the lower shoulder 97 on the apertured plate to bear against the inwardly projecting legs 99' of the angles 99 and press the pair of headers 104 to which the angles 99 are attached down toward the end tube member 44 and against the wing skin 30 when it is desired to take up slack created by squeezing molten thermoplastic out of the bond line during welding, as will be described below.

The lower edges 108 of the upper headers 104 are contoured to conform to the profile of the wing box 38, and the upper edges 109 of the lower headers 106 are contoured to conform to the profile of the lower surface of the wing box 38. Thus, in the arrangement shown in FIG. 3 in which seven spars are arranged in a parallel array to which the upper wing skin 30 and the lower wing skin 32 are to be welded, the upper and lower profiles of the wing skins to be welded to the spars are determined by the curved surfaces defined by the lower and upper edges 108 and 109, respectively, of the headers 104 and 106.

Weld Skate

The weld skate 102 is drawn at a controlled speed along the surface of the wing skin over the spar cap 35 to which the wing skin is to be welded. The weld skate 102, shown in detail in FIGS. 12 and 14–18, includes an upper module 110 and a lower module 112 connected by a link 114. The upper module 110 has a frame 116 on the underside of which is mounted an upper connector block 117 to which the upper end of the link 114 is pivotally connected. An upper air cylinder 118 of a fluid pressure system shown in FIG. 13, for pressing pressure pads 182 and 184 on the lower module 112 against the parts to be welded, is mounted on the upper side of the frame 116 for receiving air under pressure through an air supply line 119 under control of an air pressure control 121, shown in FIG. 13A. A piston 120 in the air cylinder 118 has a piston rod 122 coupled to a piston rod 124 of a piston 126 in a lower liquid cylinder 128 fastened to the underside of the frame 116. The liquid used in the liquid portion of the fluid pressure system could be hydraulic fluid or any other suitable liquid, but water is used in this application to prevent contamination of the plastic parts in the event of leaks from the fluid pressure system. The upper air cylinder 118 combined with the lower water cylinder 128 constitutes a pressure intensifier assembly wherein the air pressure provided through the air supply line 119 in the larger diameter air cylinder 118 generates a force acting against the lower piston 126 in the water cylinder 128 to increase the pressure exerted on the water in the cylinder 128 by the piston 126 . A water line 129 connects the cylinder 128 to a pair of cylinders 166 and 168 on the lower module 112 of the weld skate 102 by which pressure is exerted through the pressure pads 182 and 184 of the weld skate 102 against the parts to be welded together during the welding operation described below.

Figure 14:
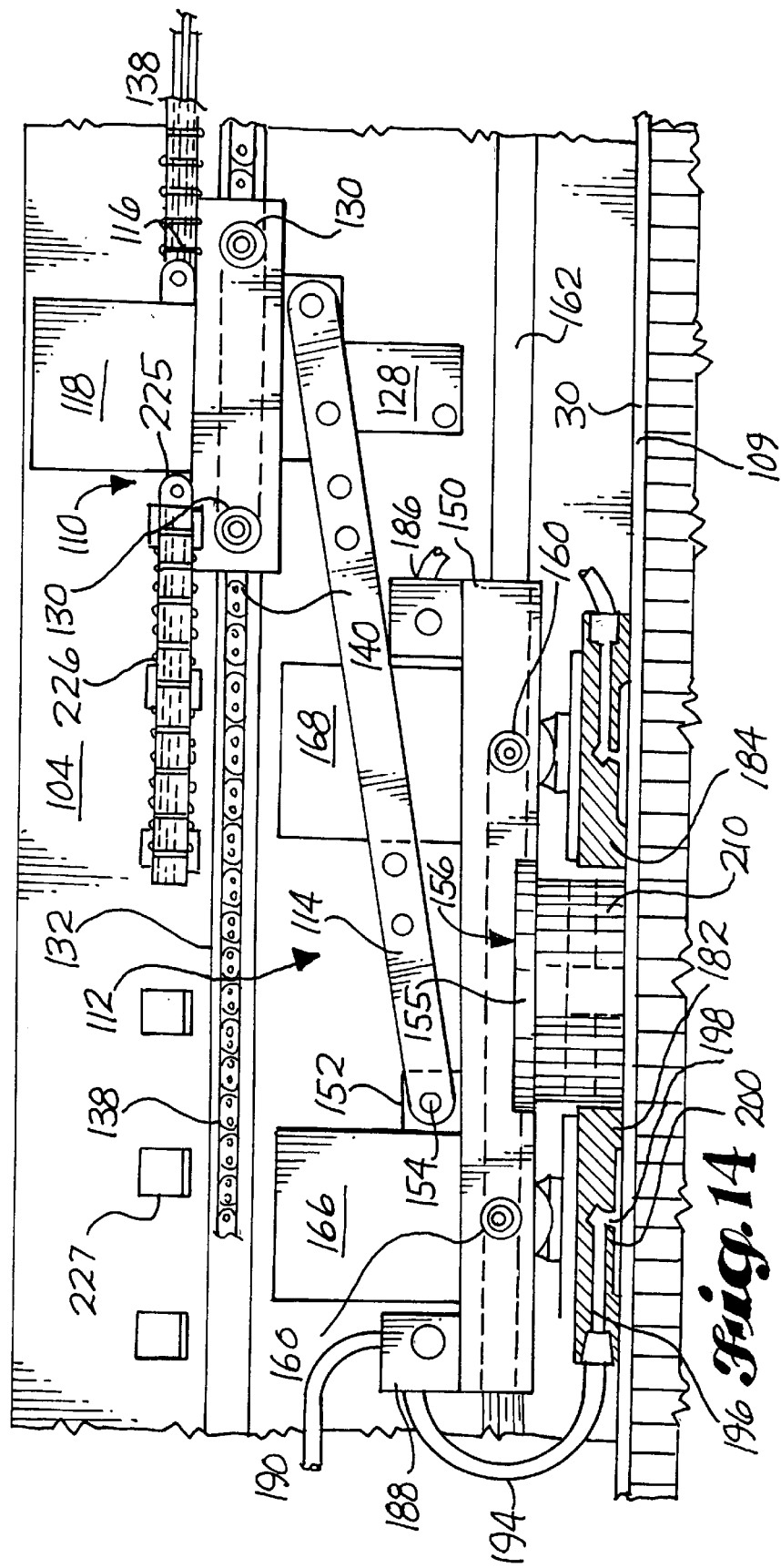
FIG. 14 is an elevation of the weld skate shown in FIG. 12, shown engaged in the cam grooves of one header and acting on a wing skin.
Figure 19:
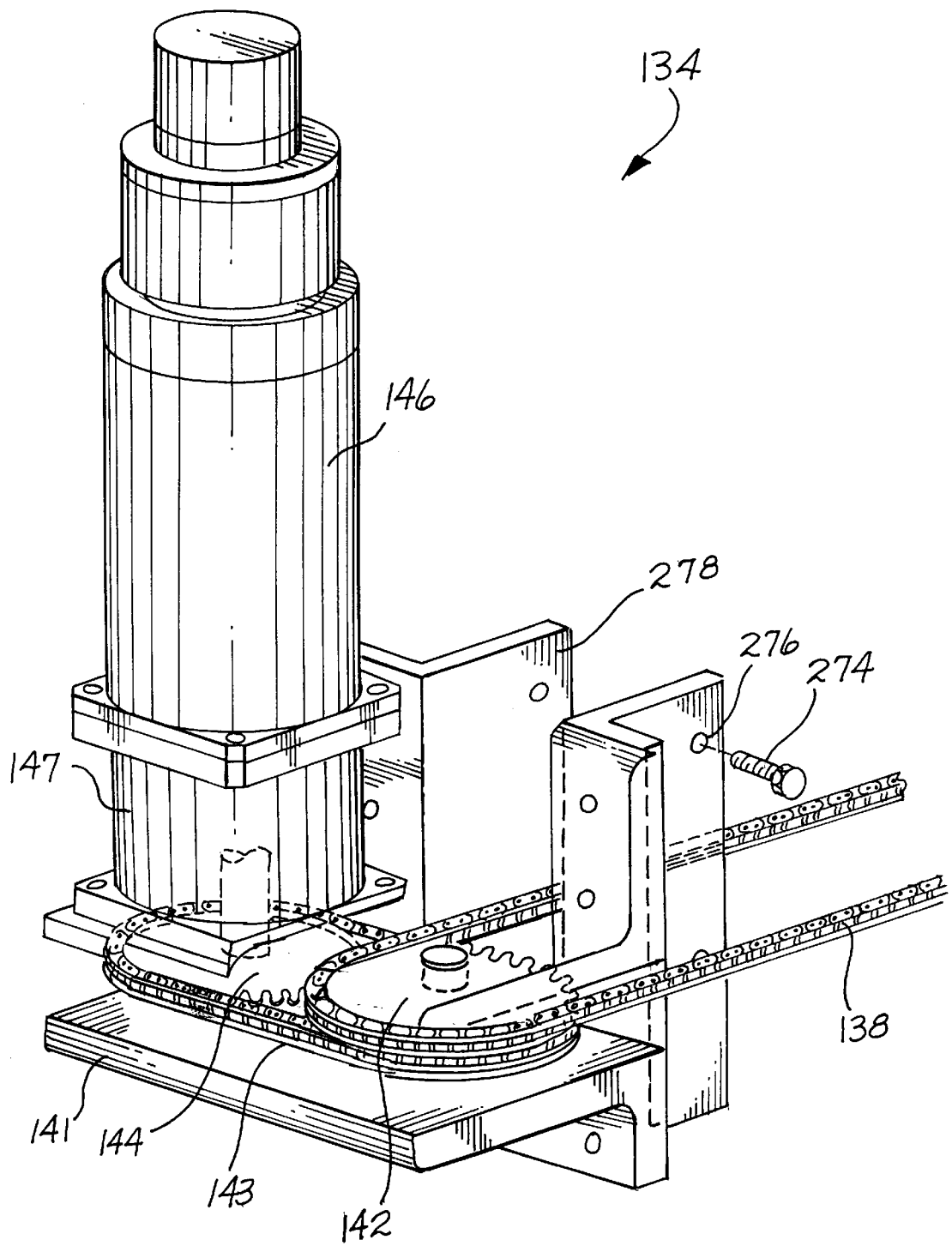
FIG. 19 is a perspective view of the motor module shown in FIG. 1 for moving the weld skate shown in FIG. 12.
Figure 20:
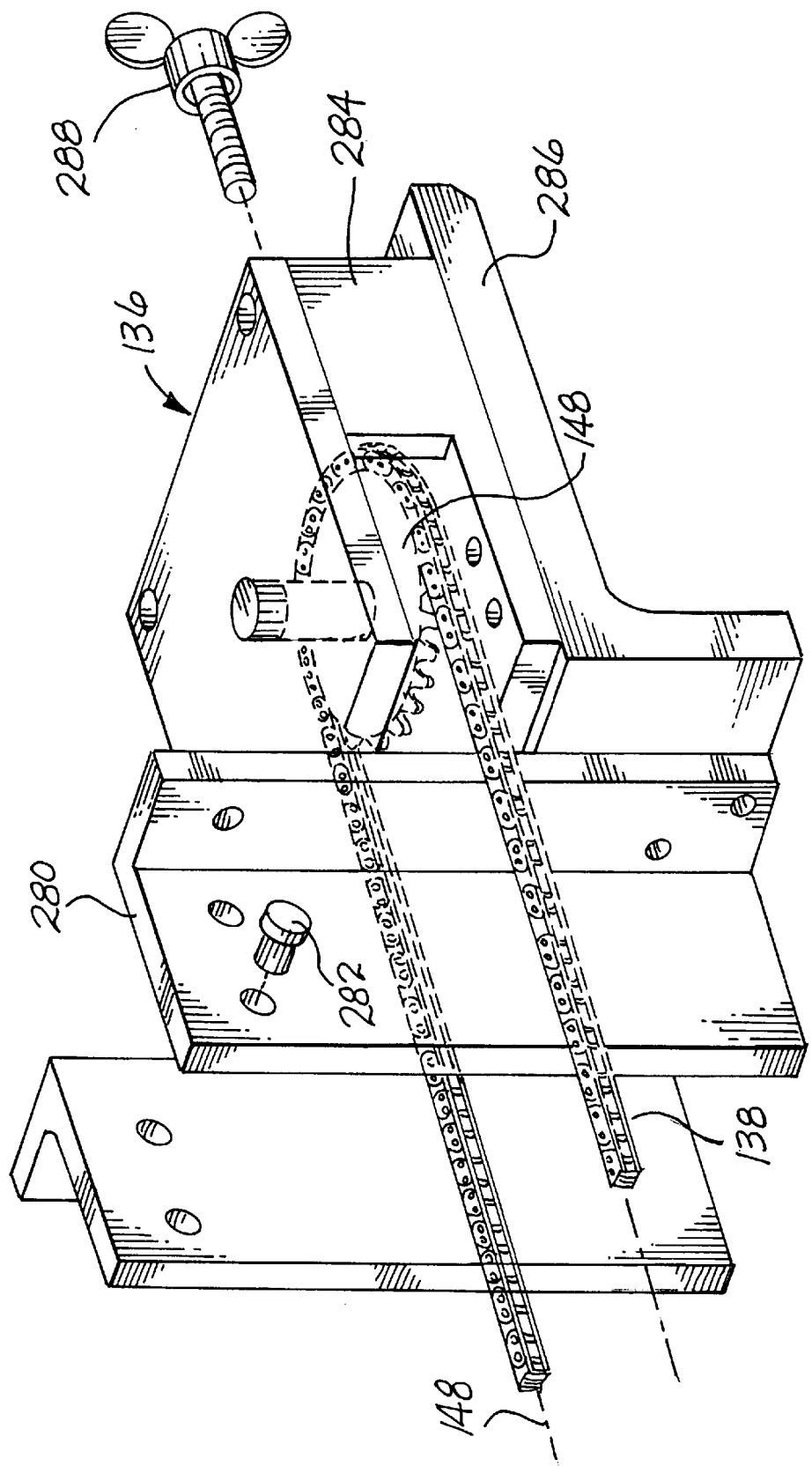
FIG. 20 is a perspective view of the sprocket module shown in FIG. 1 for supporting and tensioning the chain that moves the weld skate shown in FIG. 12.

As shown in FIG. 14, a pair of camroll bearings 130 projects from each side of the upper frame 116 into a straight outer cam groove 132 machined into the facing surfaces of each pair of upper headers 104. The cam groove 132 runs straight across the upper headers 104 adjacent and parallel to their flat upper surfaces 101, and receives the camroll bearings 130 to guide and support the upper module 110 as it is pulled from one end of the FAJ 40 to the other end by a motive mechanism, shown in FIG. 1. The motive mechanism includes a flexible line for transmitting tensile force, such as a cable, belt or chain 138, driven by a motor module 134 fastened at one end of the headers as shown in FIG. 1 and shown in detail in FIG. 19. The chain 138 is looped around a sprocket module 136, shown in FIG. 20, fastened to the opposite end of the headers 104 and 106 during the welding operation. The chain 138 is fastened at one end to a connector 140 attached to the upper module frame 116, and passes around an idle sprocket 142 on the motor module 134. The idle sprocket 142 is driven by a short chain loop 143 from a drive sprocket 144, driven through a reduction gearbox 147 by a stepper motor 146 on the motor module 134, although other types of precision controlled motors, such as a servomotor, could be used. The two sprockets 142 and 144 are journaled between a lower bracket 141 and an upper support bracket which also carries the stepper motor 146 and the gearbox 147.

The loop of chain 138 extends completely lengthwise of the FAJ 40, with the inner run of the loop extending along the centerline between the pair of headers 104 on which the motor module 134 and the sprocket module 136 are mounted, and the outer run of the chain loop 138 extending outside of the pair of headers. The stepper motor 146 can be speed controlled very precisely to drive the drive sprocket 144 to pull the chain in either direction and pull the upper module 110 along the outer cam groove 132 between the pair of upper headers 104 at any desired rate of speed, and can be programmed to change speed to account for changes in parameters, such as wing skin thickness or power input.

The movement of the upper module 110 is transmitted through the link 114 to the lower module 112. By making the outer cam groove 132 straight, there need be no provision for accommodating the change in the effective length of chain 138 as the lower module 112, following the inner curved cam groove 162, moves vertically toward and away from the horizontal line between the sprockets on the motor module 134 and the sprocket module 136. The upper module 110 travels smoothly back and forth along the cam groove 132 without binding or experiencing undo stresses that otherwise could be caused by non-aligned forces exerted by the chain 138 in a line of action deviating from the direction of the cam groove 132. Movement of the upper module 110 as it is drawn to the right in FIG. 14 pulls the lower module 112 by way of the link 114.

Figure 15:
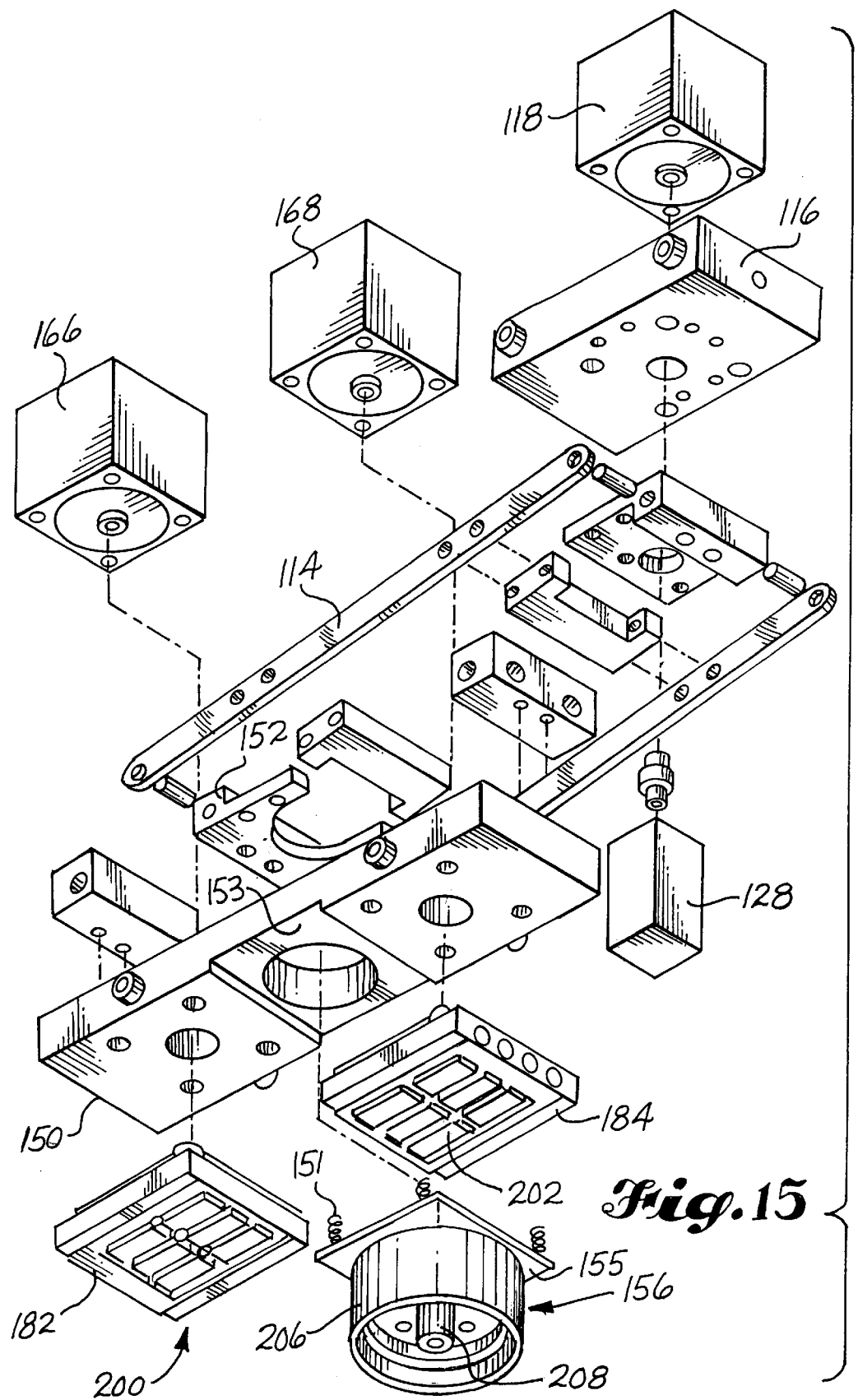
FIG. 15 is an exploded view of the weld skate shown in FIG. 12.
Figure 16:
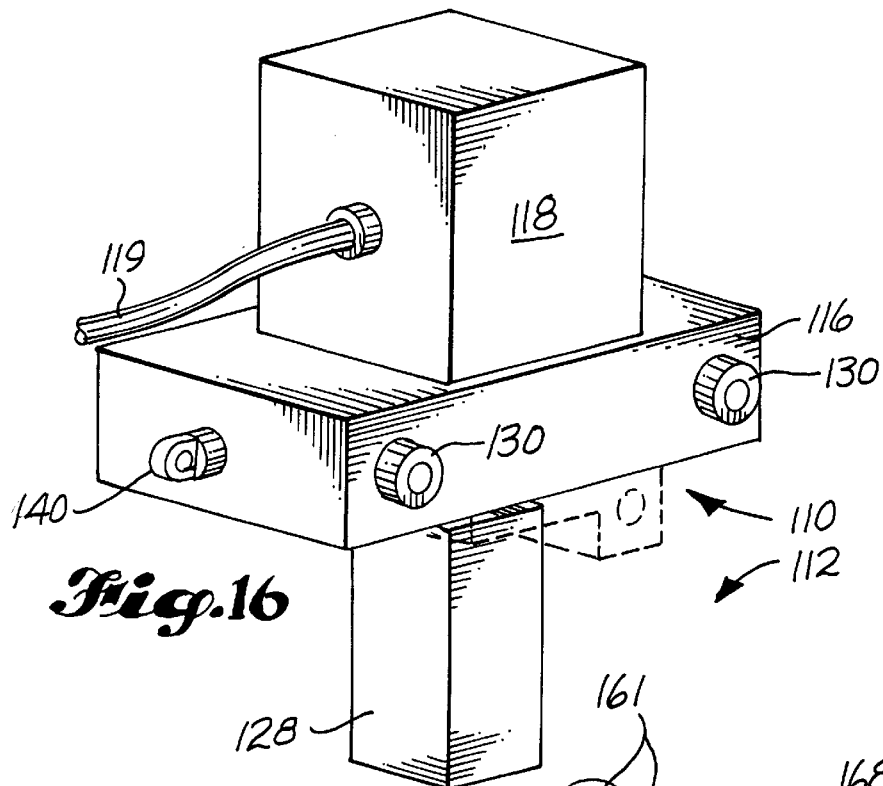
FIG. 16 is a perspective view of the top module of the weld skate shown in FIG. 12.
Figure 17:
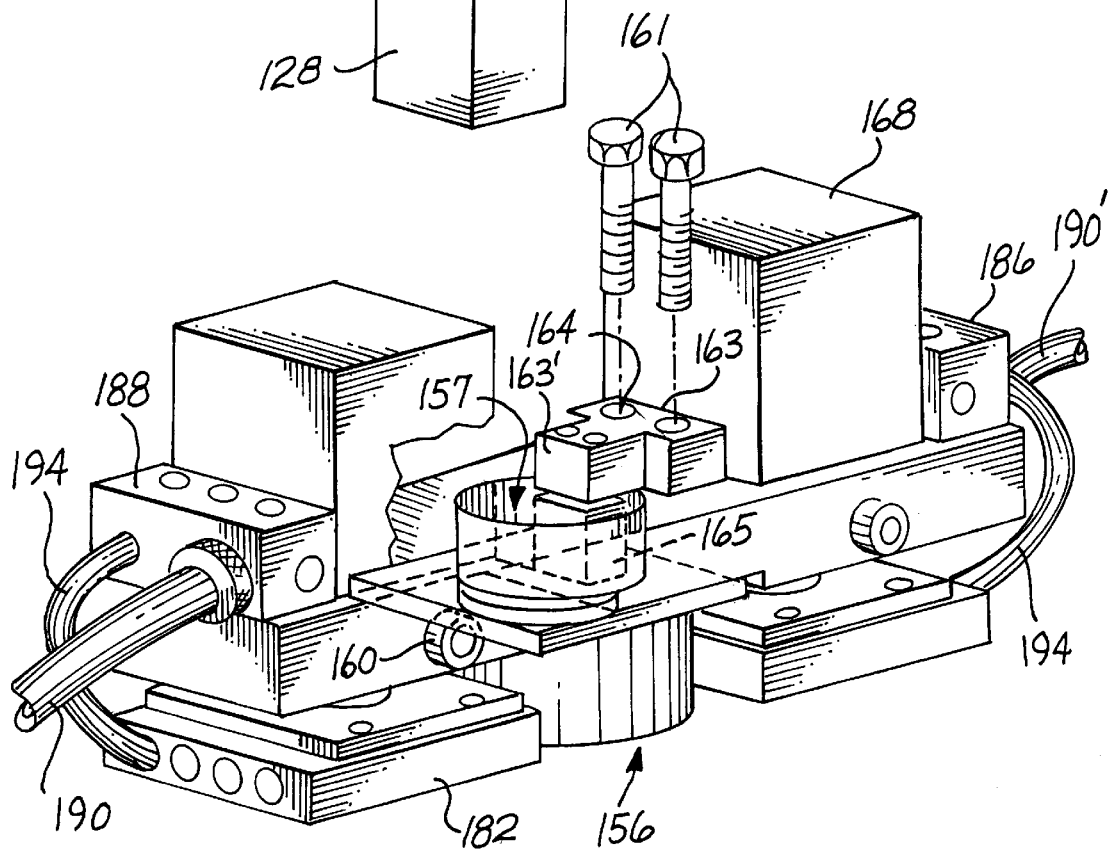
FIG. 17 is a perspective view of the bottom module of the weld skate shown in FIG. 12.
Figure 18:
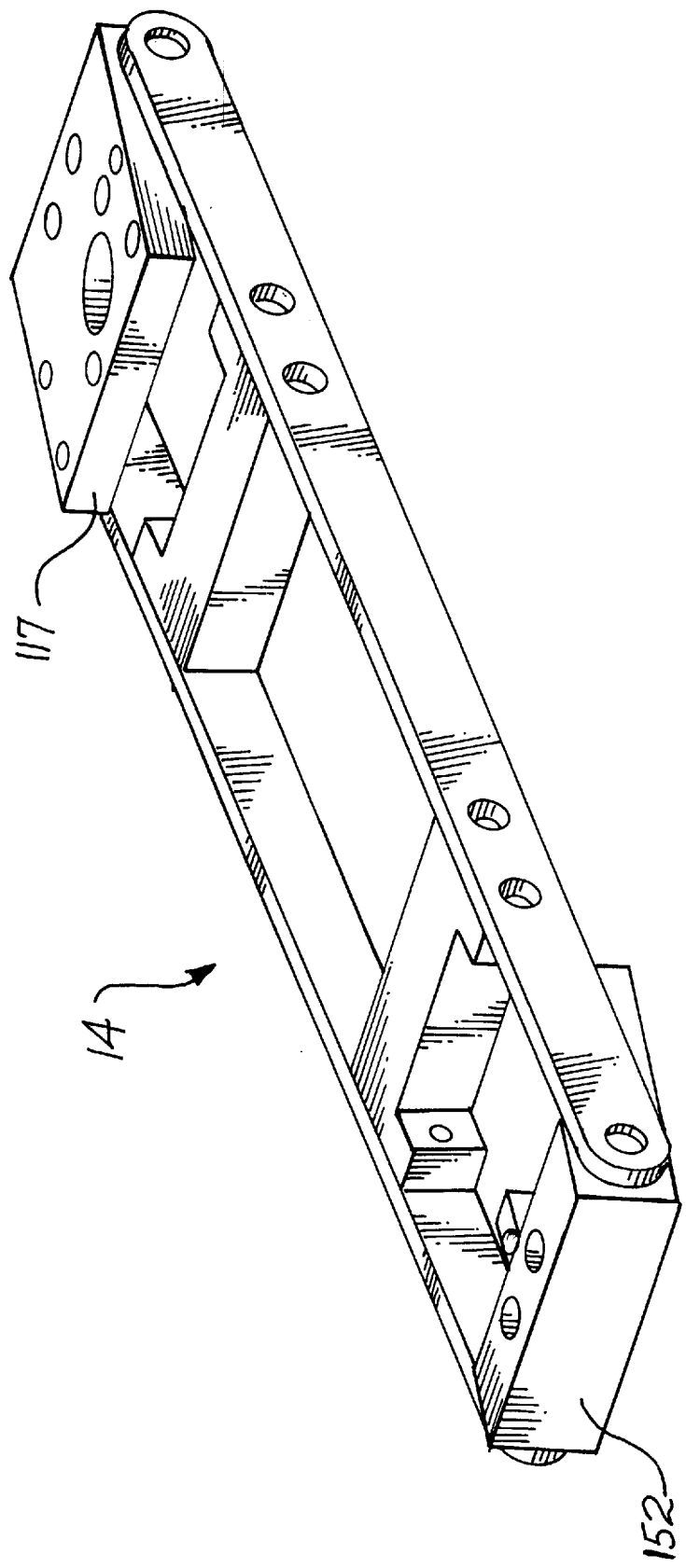
FIG. 18 is a perspective view of the link and connection blocks connecting the top and bottom weld skate modules shown in FIGS. 16 and 17.

The lower module shown in FIGS. 15 and 17 includes a lower frame 150 having a connector block 152 to which the lower end of the link 114 is pinned by a pivot pin 154. The connector block 152 is fastened to the top surface of the lower frame 150 slightly to the rear of a central opening 157 through which coolant lines and a power cable are routed to a coil assembly 156. The coil assembly 156 mounted on a spring loaded mounting plate 155 in a recess 153 in the lower frame 150 centrally under the central opening 157 in the frame 150.

A pair of longitudinally spaced camroll bearings 160 is mounted on both longitudinal sides of the frame 150 and protrude laterally therefrom and into an inner cam groove 162 machined into the sides of the headers 104 parallel to the inner contoured edge 108 of the headers 104. Engagement of the camroll bearings 160 in the cam groove 162 guides the lower module 112 as it is drawn to the right in FIG. 14 by the upper module 110 through the link 114. The camroll bearings also transmit reaction force, from the force exerted by the pressure pads 182 and 184, between the lower module 112 and the headers 104 or 106.

The coil assembly 156 is mounted on the lower module frame 150 by way of a coil assembly mounting block 163 which is fastened to the frame 150 through two laterally elongated holes 164 which each receive a bolt 161 that is threaded into a tapped hole opening in the top surface of the frame 150. The mounting block 163 has a portion 163' overhanging the opening 157 and vertically aligned with a spacer block 165 that is connected to the spring loaded mounting plate 155. A pair of shoulder bolts extend through two vertical holes in the overhanging portion 163' of the mounting block 163 and are threaded into tapped holes in the spacer block 165. This arrangement permits the coil assembly 156 on its mounting plate 155 to move vertically under the biasing influence of the springs 151 between the recess 153 and the mounting plate 155, while constraining lateral movement of the coil assembly 156. The coil assembly is laterally adjustable on the frame 150 by loosening the bolts 161 that hold the mounting block 163 to the top of the frame 150 and moving the mounting block 163 and the attached spacer block 165, mounting plate 155 and coil assembly 156 laterally one way or the other within the limits permitted by the dimensions of the elongated holes 164 in the mounting block, then retightening the bolts 161.

Figure 13:
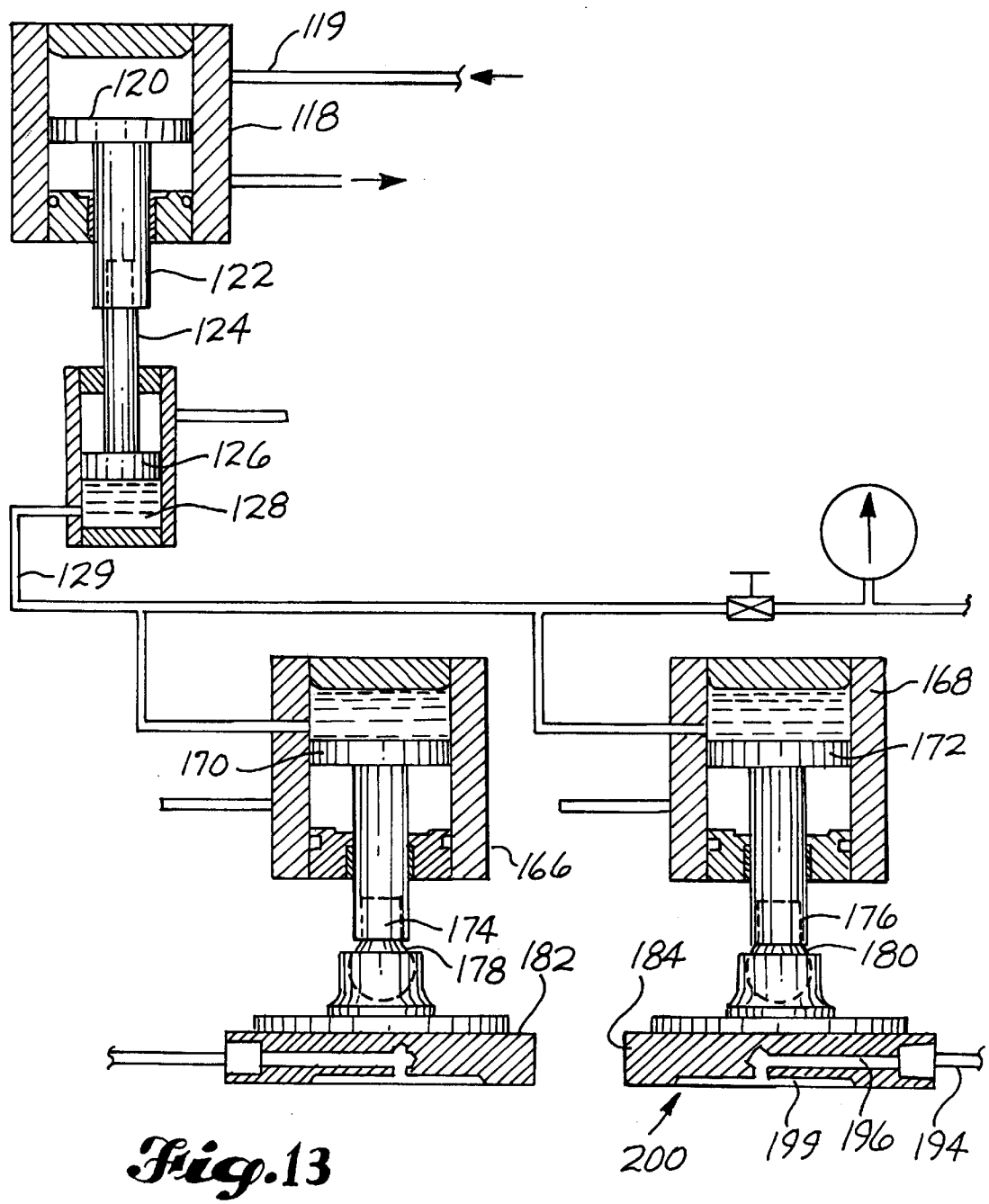
FIG. 13 is a schematic view of the fluid circuit for exerting force on the pressure pads of the weld skate shown in FIG. 12.

Two cylinders 166 and 168 are mounted on the frame 150 fore and aft of the central opening 157 in the direction of motion of the lower module 112 when it is drawn along the cam groove 162 by the link 114. As shown in FIG. 13, the cylinders 166 and 168 have pistons 170 and 172, respectively, connected through piston rods 174 and 176 to swivel joints 178 and 180 to exert force on air bearing pressure pads 182 and 184.

Figure 12:
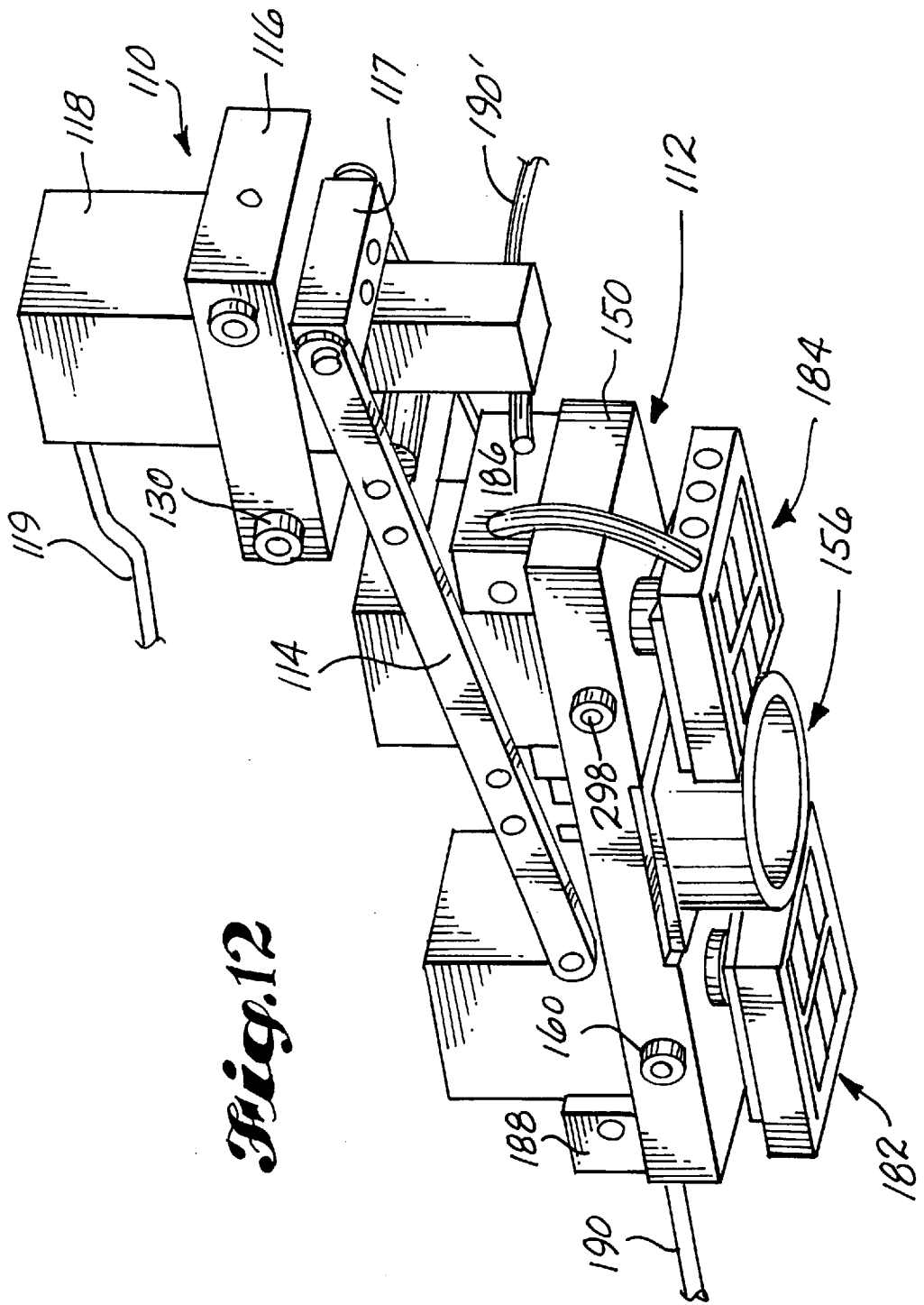
FIG. 12 is a perspective view of the weld skate shown in FIGS. 1, 7 and 11.

Air manifolds 186 and 188 are fastened to the front and rear edge, respectively of the frame 150 as shown in FIGS. 12, 14 and 17. The air manifolds distribute air that is provided through two external air lines 190 and 190', which lie in the space between the headers 104 directly on top of the wing skin 30 or, with the FAJ 40 in its vertical position, on the facing surface of one of the headers. The air lines 190 and 190' are each stiff enough to pulled and pushed, respectively, through the space between the headers 104 or 106 by the motor module 134 pulling the skate through the headers. Separate air lines 194 (only one of which is shown to each manifold for clarity of illustration) run from the manifold 186 and 188 to four air channels 196, shown in FIG. 14, in the pressure pads 182 and 184. Air from the channels 196 passes out through holes 198 into a pattern of shallow grooves 199 in a bottom air bearing surface 200 of the pressure pads 182 and 184 to pressurize the interface between the pressure pads 182 and 184 and the wing skin 30. The pressurized air cushion created by the pressurized air under air bearing surfaces 200 of the pressure pads 182 and 184 reduces the frictional drag between the wing skin and the pressure pads and thereby reduces the force that must be exerted by the stepper motor 146 through the chain 138 on the upper module 110 to draw the lower module 112 along the wing skin 30 during welding.

Figure 21:
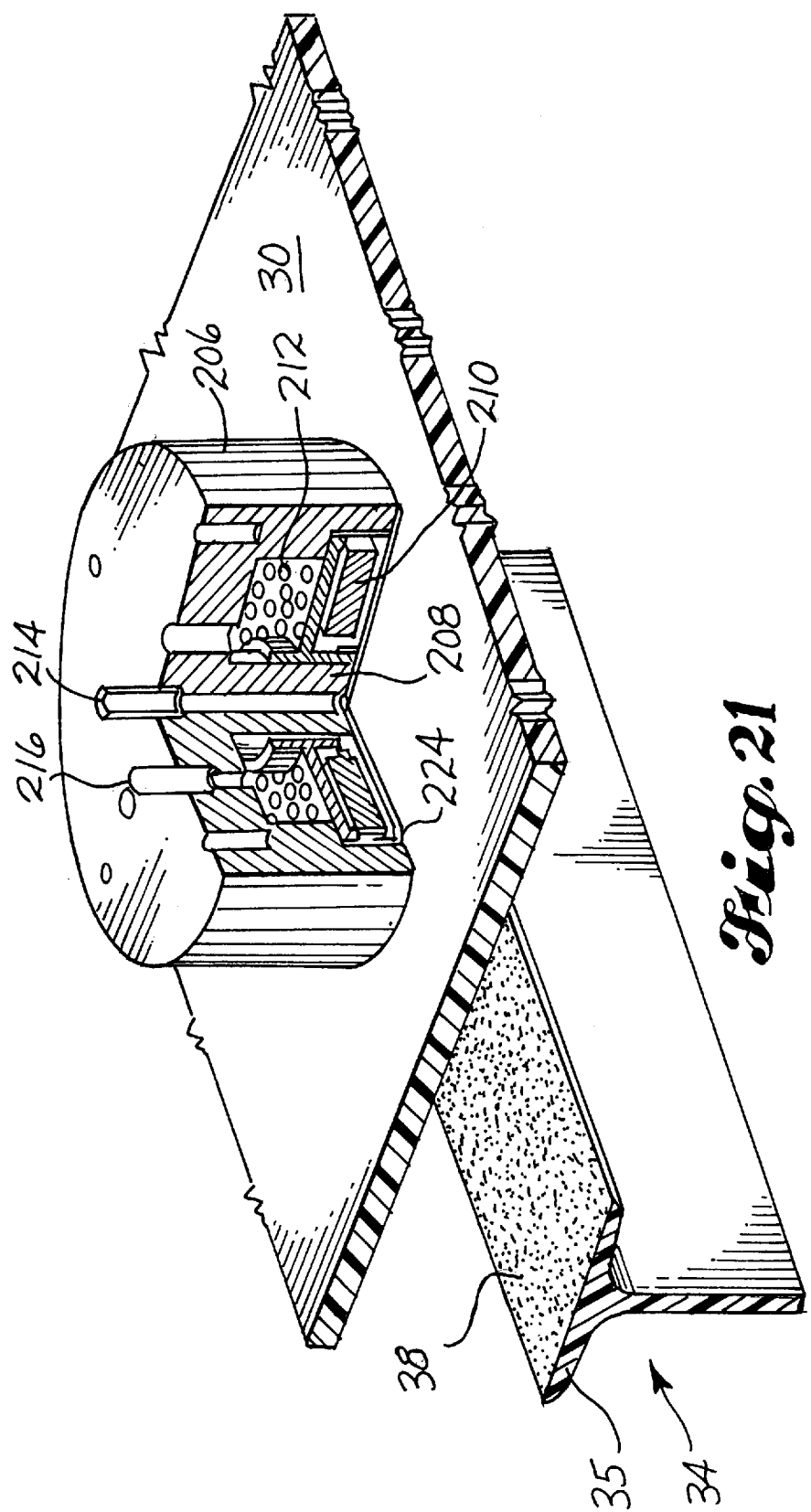
FIG. 21 is a partially cut away perspective view of the induction coil assembly that is mounted on the weld skate shown in FIG. 12.

The coil assembly 156 includes a cylindrical housing 206 and a central ferromagnetic core 208 around which the coil 210 is wound. Only the housing is shown in FIG. 15 for clarity of illustration. One preferred coil assembly 156 is shown in U.S. Pat. No. 5,313,037 entitled "High Power Induction Work Coil for Small Strip Susceptors" issued to Karl Hansen and C. David Lunden on May 17, 1994. Another preferred coil assembly is shown in U.S. Pat. No. 5,444,220 of Karl Hansen and Edward Weisberg filed on Dec. 5, 1994 and entitled "Asymmetric Induction Work Coil for Thermoplastic Welding", the disclosure of which is incorporated by reference. As shown in FIG. 21, a water distribution plate 212 is positioned in the housing 206 of the coil assembly 156 over the coil 210 downstream of the coil 210 (in the direction of water flow) to ensure that cooling water pumped into the housing 206 through a water inlet 214 circulates evenly around the induction coil 210 before exiting through a water outlet 216. Water lines for water flow into and out of the housing 206 are routed to the coil assembly 156 through the central opening 157 in the frame 150, as are the electrical power lines for energizing the coil. A sole plate 224 of nylon or some other suitable low friction nonmagnetic material is sealed around the bottom of the cavity in the housing 206 wherein the induction coil 210 and the distribution plate 212 are mounted to prevent water from leaking put of the cavity and onto the wing skin 30.

The coolant and power lines for the coil are routed through the central opening 157 and along the link 114 to a connector post 225 attached to the backside of the air cylinder 118 on the upper module 110. From there, those lines and the air line 119 to the air cylinder 118 are routed through a conventional cable carrier 226, such as the Mini Plastic Track, Model 13, sold by Olflex Company in Fairfield, N.J., fastened at one end to the post 225 and at the other end to the far end of the FAJ 40. The cable carrier is supported on its side on angle brackets 227 fastened to the inner surface of one of the headers 104 of each pair of headers and lies between the surface of the header and the side of the air cylinder 118 which is offset to one side of the upper module frame 116 to provide clearance for the cable carrier. The cable carrier 226 is looped around behind the skate and rolls up behind it as the skate is pulled along between the headers, carrying the electrical cables 246 and 248, water lines 218, 219 and 129, and air line 119 in a well ordered kink-free routing.

Controls

Figure 22:
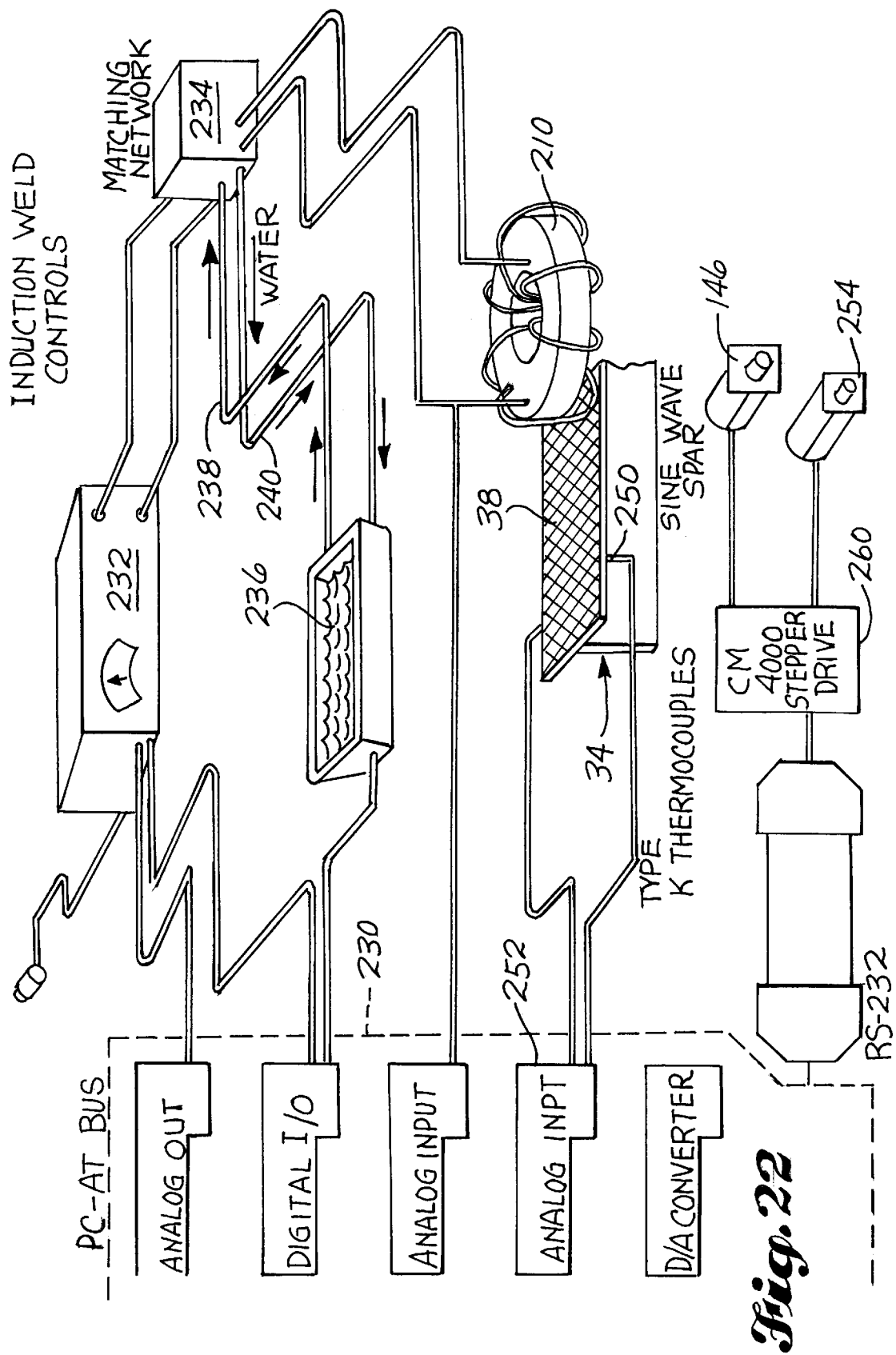
FIG. 22 is a schematic of the control system for the induction welding apparatus shown in FIG. 1.

A control system 228 for the operation and movement of the weld skate 102, illustrated in the schematic in FIG. 22, includes a computer 230 such as a AT type personal computer having a conventional software control program such as Lab Windows installed for producing control signals, in programmed response to sensor and clock inputs, for operating the functional elements of the control system, including a power supply 232, a matching network 234, and a coolant supply heat exchanger module 236 for extracting heat from a coolant such as water and for pumping the coolant through a supply line 238 and a return line 240 in a closed loop cooling system. A Hall effect sensor 242 placed on one of the power leads 246 and 248 from the matching network 244 to the induction coil 210 provides feedback information on the current to the induction coil.

Thermocouples 250 are mounted under the spar cap of the spars 34 to provide feedback information to the computer 230 regarding the temperature of the spar cap. The temperature signals from the thermocouples 250 are input to a temperature comparitor which is used to assess the alignment of the coil 210 over the susceptor in the bond line. The temperature comparitor function is preferably performed in the software of the control program, but may be performed by a separate temperature comparitor 252. When a temperature discrepancy between the thermocouples on one side of the spar is noted compared to the temperature signals from the thermocouples on the other side of the spar, it indicates that the coil 210 is not aligned exactly over the susceptor. To adjust the position of the coil assembly 156 relative to the centerline of the susceptor 38, a lateral position adjustment device 254 for adjusting the lateral position of coil assembly 156 on the frame 150 may be provided. One convenient arrangement of the lateral position adjustment device includes an eccentric ring 256 rotatably mounted on the frame 150 and bearing against one side of the coil positioning block 158 and an air cylinder 258 biasing the block 158 back against the eccentric ring. An actuator such as an air operated stepper motor 260, is engaged with the eccentric ring 256 to rotate the ring about its eccentric pivot and force the positioning block 158 and the coil assembly 156 to move laterally on a set of lateral guides 262. The stepper motor 256 is energized by the control system 228 in response to a temperature discrepancy signal from the temperature comparitor 252 to rotate the ball screw 256 to center the induction coil 210 over the susceptor and equalize the temperature sensed by the thermocouples 250. Another sensor feedback to the lateral position adjustment control device is disclosed in a patent application by C. D. Lunden entitled Eddy Work Coil Self Steering System, wherein two peripheral pick-up coils are disposed around the primary work coil 210 and are connected in differential mode, so that a differential voltage vanishes when the work coil 210 is centered over the susceptor 38. The two pick-up coils are preferably tipped at 45(5) to the axis of the primary coil 210 to intercept minimal signals. This lateral position adjustment control device using these feed-back signals can maintain the position of the coil assembly 156 within about 0.020" from the centerline of the susceptor 38.

The air pressure in the air cylinder 188 is set, maintained, and adjusted by an air pressure control system to control the pressure exerted by the pressure pads 182 and 184 against the wing skin 30 or 32. The air pressure control system may be a simple pressure regulator that maintains the pressure at a preset value, or it may be provided with pressure feed back signals from sensors, such as load cell in or adjacent to the camroll bearings 130 and 160, and adjust the air pressure in the cylinder 118 in accordance with a predetermined pressure schedule keyed to the wing skin thickness or other process parameters. The preferred air pressure control system is the module 121 shown in FIG. 13A. It includes a filter 263 for filtering out the usual debris found in shop air supply lines, and a pressure regulator 264 for reducing the pressure in the shop air system to the range at which the cylinder 118 is designed to operate. A secondary filter 265 cleans the shop air even further to avoid cloging the following components.

An adjustable flow control 266 in the line 119 passes air freely through a check valve in the direction toward the air cylinder 118 (to the left in FIG. 13A) and allows restricted passage of air in the opposite direction through an adjustable orifice. The flow control device 266 may be an "FC" series flow control sold by Dynamco Corp in McKinny, Tex. A relay valve 267 is installed in the line 119 adjacent the flow control 266 for its adjustable pressure switching function. The relay valve 267 changes its state from open or closed to the opposite condition whenever the pressure differential sensed at the two ports 268 and 269 connected upstream of the flow control and downstream of the relay valve, respectively, exceeds a preset value. Thus, when the pressure in the air cylinder 118 increases because of a undulation in the spar 34, the relay valve will sense the pressure differential and close, thereby preventing all the air from bleeding out of the system through the flow control 266 and the bleed port in the pressure regulator 264. When the pressure blip is past, the differential pressure across the relay valve 267 and 266 returns to normal and the relay valve reopens, allowing normal adjustment of pressure by the regulator 264.

Operation

In operation, the FAJ 40 is configured to receive the tooling 100. If the part to be manufactured is smaller than the work area enclosed by the peripheral tubes 44 and 45, an intermediate tube member 70 will be installed laterally between the tube members 45 and 45' parallel to the end tube members 44 and 44' to create a smaller work zone within the FAJ 40. Otherwise, the entire work zone within the longitudinal tube members 45 and the end tube members 44 is used to support the parts to be welded.

Panel support brackets 68 are bolted to the tube members 45 and 45' on every other lateral connector plate 64, as shown in FIG. 3, and right angle connector brackets 65 are bolted to the other lateral connector plates 64 between the panel support brackets 68. Tie bars 66 are bolted to the connector brackets 65, and support beams 107 are fastened at their ends to the lower ends of the tie bars 66, spanning the box frame 42. The block support beams 73 with their spar support blocks 75 attached are mounted on the end connector plates 72 and 74 at opposite ends of the FAJ 40 for attachment of the spars 34.

Figure 9:
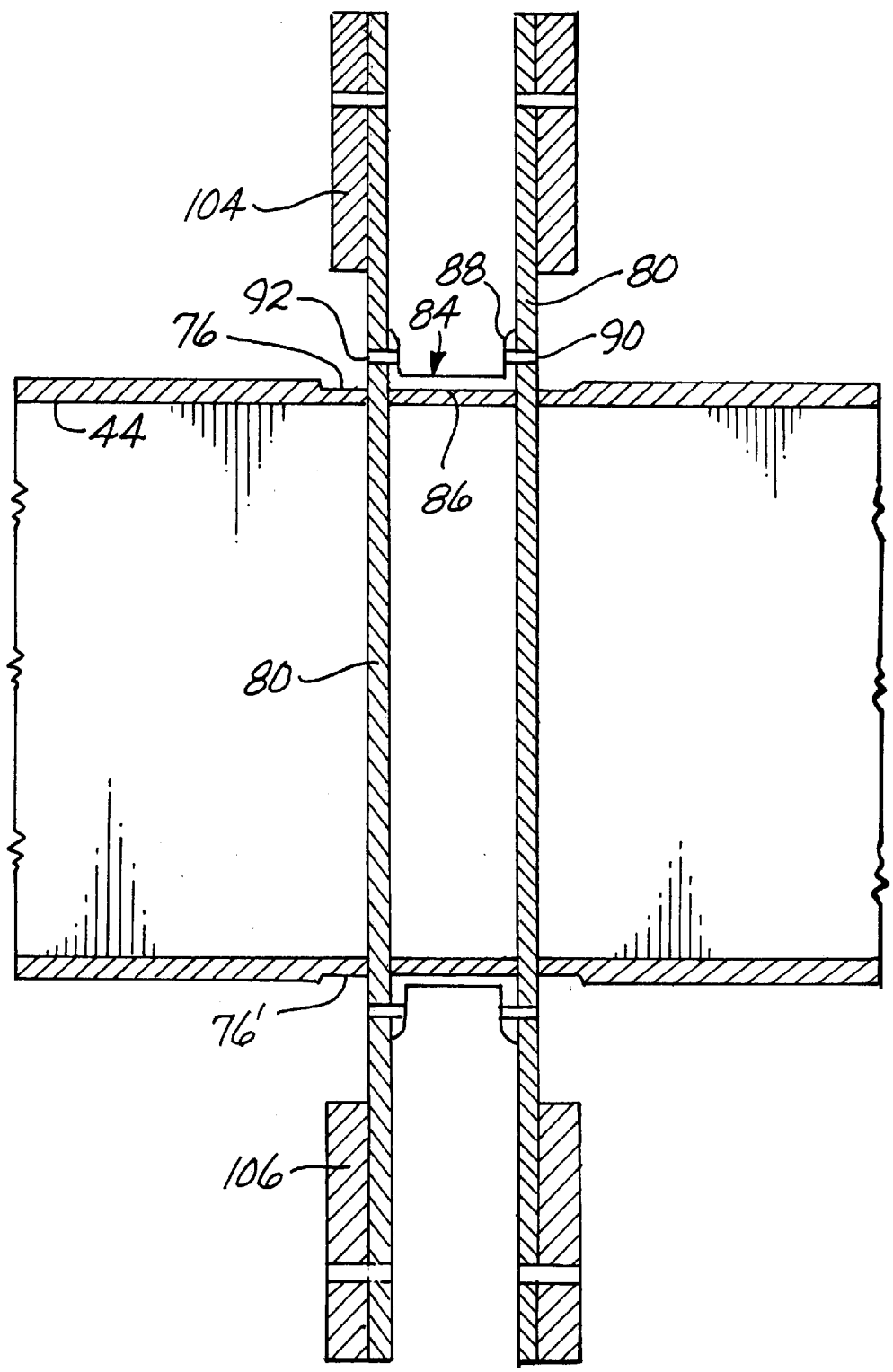
FIG. 9 is a sectional elevation along lines 9—9 in FIG. 8.

As shown in FIG. 9, attachment mounts 84 are connected between pairs of spreader bars 80 and 82 by machine screws 90 extending through the slots in the spreader bars and threaded into the tapped holes in the upstanding legs 88 of the attachment mounts 84. The spreader bars 80 and 82 are inserted vertically into the slots in the slotted attachment zones 76 and 78 in the end tube members 44 and 44'. The attachment mounts 84 are located on the attachment zones 76 and 78 by two positioning pins through holes in the flat base 86 of the attachment mounts 84, and are fastened to the attachment zones 76 and 78 with a single machine screw for each attachment mount. Lower attachment mounts 84' are attached to the underside of the end tube members 44 and 44' between the spreader bars 80 and 82 and their upstanding legs 88' are attached to the spreader bars 80 and 82 by machine screws 90' threaded into the tapped holes 92' in the spreader bars 80 and 82.

With the FAJ 40 pre-configured to receive the spars 34, the ribs 36, and the tooling 100, the FAJ 40 is rotated to its vertical orientation for installation of the spars 34 and ribs 36. The spars and ribs are removed from the oven where they were heated to about 250(5)F to drive off moisture which is absorbed from the air by the hydrophillic Klll-B resin. Moisture absorbed in the resin of the composite material from which the spar and rib caps are made could flash to steam during welding if the spars and ribs were not dried before welding. Steam generated below the surface of the spar and rib caps could cause delamination and resultant weakening of the welded structure, so the parts are oven dried or heated by a heater blanket prior to welding as a precaution against such delamination.

Figure 23:
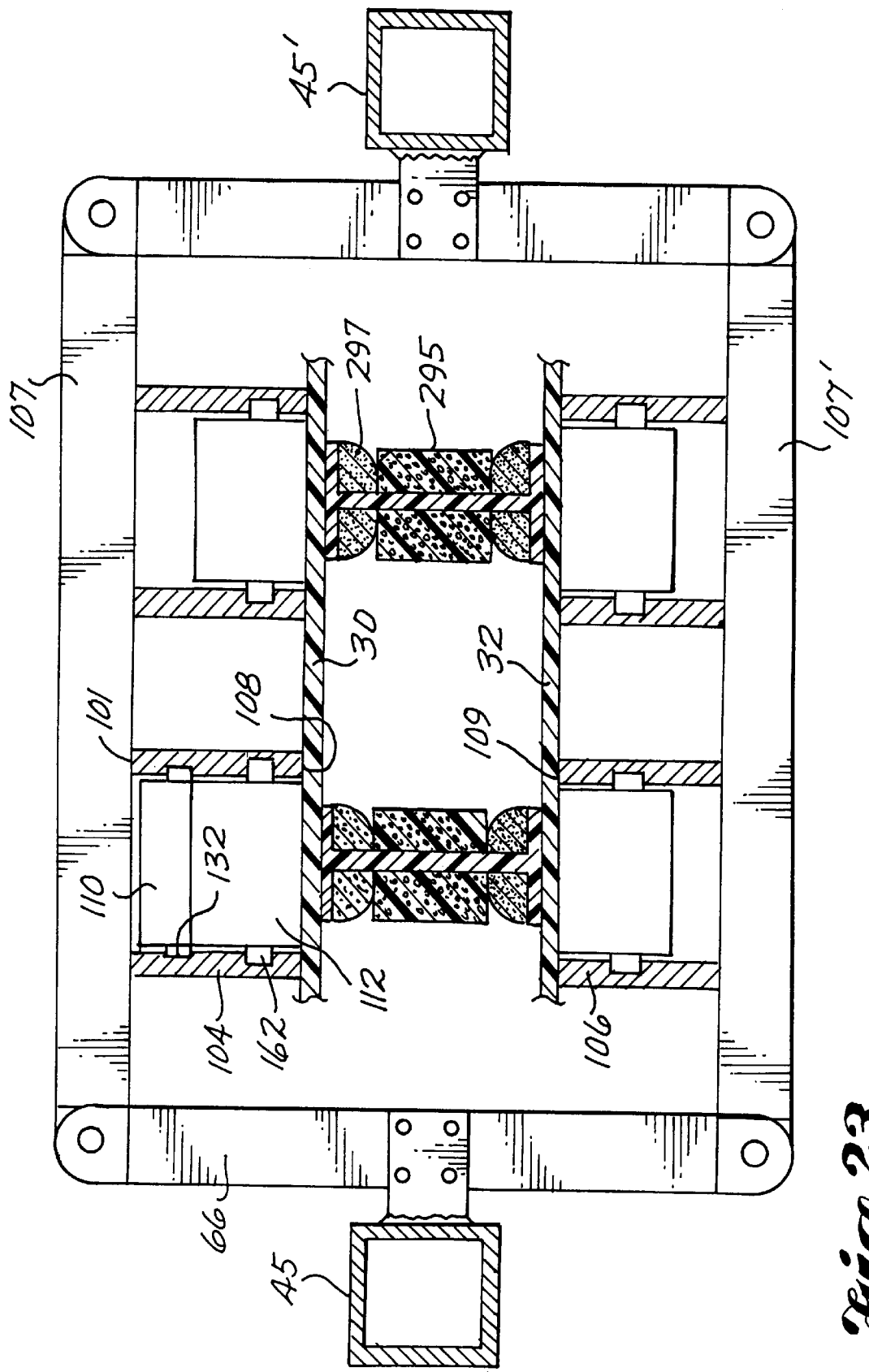
FIG. 23 is a sectional end elevation of the apparatus shown in FIG. 1, showing the spar cap support tooling in place between the spar caps.

Cap support tooling may be placed under the spar caps 35 and rib caps 37 to prevent sagging or delamination of the spar caps 35 or rib caps 37 as a result of heating of the thermoplastic material of the spar and rib caps during welding. The cap support tooling can take many forms, such as the structure shown in FIG. 23, and can be prepared in advance of installation of the ribs and spars into the FAJ 40. Foam blocks 295 are placed against the spar and rib webs and a light weight, high temperature, castable mixture of epoxy resin and glass microspheres is packed into the space between the blocks 295 and the spar and rib caps to form a cast supporting buttress under the spar and rib caps.

The spars are attached to the sides of the spar support blocks 75 by bolts which extend through holes adjacent the ends of the web in the spars 34. When all seven spars 34 are loaded into the FAJ 40, the ribs 36 are attached at their ends to the spars by right angle clips bolted to the spar web and to the ends of the rib webs. The webs of the ribs 36 may be split longitudinally to facilitate flush alignment of the tops of the rib caps 37 with the tops of the spar caps 35 to ensure good surface contact of the spar and rib caps 35 and 37 with the inner surface of the top and bottom wing skins 30 and to 32.

With the spars and ribs now installed in the FAJ 40, the rectangular box frame 42 is rotated 90° to its horizontal orientation with the spars inverted, that is, with the lower spar cap on top. A dummy lower skin 32' is indexed in place on the lower panel support brackets 68 and is laid on the lower spar caps 35' of the spars 34. The lower headers 106 are attached at their ends to the spreader bars 80 and 82, with the inner contoured edge 109 of the lower headers 106 in contact with the outer surface of the dummy lower wing skin 32'. The dummy wing skin 32' is used to prevent damage to the actual wing skin and to prevent the actual wing skin 32 from being exposed to moist air during the time that the top wing skin 30 is being welded to the spars and ribs. Lower support beams 107' are positioned across the box frame 42 over the outer edges of the headers 106 and are attached to the lateral tie bars 66 by bolts through the elongated holes 69 in the lower ends of the lateral tie bars 66. The elongated holes 69 enable the support beams 107' to be positioned in contact with the outer edge of the headers 106 to support the headers during the welding operation. Lateral support blocks 111 welded onto the inner surface of the support beams 107 help to support the lower headers 106 against lateral spreading and sagging during the welding operation when the FAJ 40 is in its vertical position.

With the tooling on the lower side of the FAJ now installed, the box frame 42 is rotated 180° by disconnecting the straps which hold the box frame 42 in its cantilevered horizontal position, and rotating the box frame about its tubular pintles 50 on the semi-cylindrical gudgeon 52 on the pedestal supports 48. The supplemental legs 56 are moved to the other side of the frame and positioned on the floor to receive the sockets 60 and 62 to support the box frame 42 in its rotated horizontal position, and that same side of the box frame 42 is secured against the tops of the supplemental legs 56 and 58 by straps secured to anchors in the floor. The box frame is now in a horizontal position with its upper side on top and the lower headers hanging from the spreader bars 80 and 82, and supported at intermediate locations by the lower support beams 107'.

Susceptors 38, encapsulated in the same resin as that used in the composite parts to be welded, are positioned over the upper spar caps of the spars 34 and the ribs 36, and may be secured in place by fusion or solvent tack welding or the like to prevent the susceptor 38 from moving during subsequent positioning of the wing skin 30 and rotation of the box frame 42. Alternatively, the susceptors may be secured to the spar and rib caps before installation in the FAJ 40. The wing skin 30 is positioned over the spar caps and rib caps and a second set of panel support brackets 68' is fastened to the lateral connector plates 64 over the wing skin 30 to help index the wing skin in position and to secure it in position against lateral shifting when the box frame 42 is rotated to its vertical position. The panel support brackets 68' ensure that the upper wing skin 30 is positioned over the spars 34 accurately so that the spars are welded to the wing skin at the correct locations. The upper headers 104 will be exactly aligned over the suscoptors when the headers 104 are installed on their spreader bars 80 and 82 by virtue of the predesigned alignment of the spreader bars and the spar support blocks 75. This ensures that the weld skate 102 will be precisely aligned over the susceptor 38 when the weld skate is pulled between the pairs of headers 104. Alignment of the weld skate 102 over the centerline of the susceptor 38 aligns the magnetic field generated by the coil 210 over the susceptor so that the eddy currents induced by the magnetic field are uniformly distributed and localized hot spots are not created which could cause localized overheating of the susceptor and the resin in the vicinity of the hot spots. Overheating can cause burning or bubbles in the resin that can adversely affect the strength of the weld, so it is to be avoided.

The inner surface of the wing skin 30 is fabricated with resin rich strips positioned along the faying surfaces of the wing skin in contact with the spar caps and rib caps. These resin rich strips facilitate the fusion bonding of the spar caps and rib caps to the inner surface of the wing skin 30 during induction heating of the susceptor since the main body of the wing skin 30 is normally provided with just enough resin matrix to bond the reinforcing fiber of the composite material together. Most of the free resin in the resin rich faying surfaces of the wing skin 30 and the spar and rib caps is normally extruded from the bond line under pressure exerted by the weld skate 102 and also by expansion of the materials as they are heated, and it is believed that the flow of the heated liquid material in the bond line facilitates the bonding of the faying surfaces in a seamless bond line.

Upper headers 104 are now positioned over the upper wing skin 30 and are secured to the upper ends of the spreader bars 80 and 82 by machine screws. The upper support beams 107 are positioned over the tops of the upper headers 104 and are secured at their ends to the top ends of the lateral tie bars 66 by single bolts which pass through the web of the support beams 107 and through the hole in the upper end of the tie bars 66. Any adjustment to insure that the headers are in contact with the wing skin can be made by loosening the bolts that hold the lower support beams 107' to the lower ends of the lateral tie bars 66 and the machine screws that hold the lower headers 106 to the lower ends of the spreader bars 80 and 82, and then tightening the header clamps 94 to pull the headers 104 down on the spreader bars 180 and 182, and then re-tightening the screws that hold the support beams 107 to the lateral tie bars 66 and the headers 106 to the spreader bars 80 and 82.

A weld skate 102 is now loaded into the slot between two adjacent headers 104 with the camroll bearings 130 and 160 entering the cam grooves 132 and 162 via access slots 270 and 272 to the cam grooves 132 and 162, respectively. After loading of the weld skate, the access slots 270 and 272 are filled with filler strips that present a continuous surface to the camroll bearings to prevent the weld skate 102 from diverting out through the access slots 270 and 272 when it reaches the slots during welding. The motor module 134 is fastened to the ends of the headers 104 by screws 274 which pass through holes 276 in connector brackets 278 and are threaded into tapped holes in the ends of the headers 104. The idle sprocket 142 on the motor module 134 is positioned to pass the outside run of the chain 138 outside of the pair of headers 104 through which the weld skate 102 is being pulled, and the inside run of the chain 138 is positioned by the sprocket 142, at its closest position to the driven sprocket 144, exactly down the centerline 149 between the pair of headers 104 where it can be connected to the centerline of the frame 116 of the upper module 110.

The sprocket module 136 is attached to the other end of the upper headers 104 by connecting a pair of opposed connector brackets 280 to the ends of the headers 104 by screws 282 in the same manner that the motor module 134 is attached to its end of the headers 104. The idle sprocket 148 is mounted in a housing 284 which in turn is mounted on tracks (not shown) on a mounting bracket 286 to which the connector brackets 280 are attached. The housing 284 is slidably adjustable on the tracks of the mounting bracket 286 by turning an adjusting thumb screw 288 which moves the housing 284 longitudinally on the tracks in the direction of the centerline 149 between the headers 104.

The outside run of the chain 138 passes around the idle sprocket 148 on the sprocket module 136 and extends the length of the FAJ 40 between two adjacent pairs of headers. The inside run of the chain 138 is conveyed down the centerline 149 of the space between the headers 104 by the inner edge of the idle sprocket 148 which is aligned with the centerline 149. The end of the chain 138 is connected to the frame 116 of the upper module 110 and the sprocket housing 284 is adjusted with the thumb screw 288 to put the required tension on the chain 138.

The box frame 42 is now rotated to its vertical orientation for welding. The welding could actually be done with the box frame in its horizontal position but the vertical position is preferred because the FAJ 40 occupies less floor space with the box frame 42 in its vertical position, and because typical aircraft wing box structures contain many subsystems requiring significant installation processes, requiring access to the internal structure. Such access is facilitated by positioning the FAJ 40 vertically.

Power, coolant and communication lines are connected to the weld skate 102, and these lines are supported in the cable carrier 226, supported in turn on the cable carrier brackets 227 connected at spaced locations along one facing surface of the pair of upper headers 104. Air lines for supplying air to the air manifolds 186 and 188 are connected to the quick release couplings 192. The volume flow rate of air required for the air bearing surfaces 200 on the pressure pads 182 and 184 is such that two air lines 190 and 194 are used. These air lines are so stiff that they are not carried by the cable carrier 226 but instead are merely pulled and pushed along by the lower module 112 of the weld skate 102. Flexible air lines with sufficient capacity could be provided, in place of the stiff air lines 190 and 194, that could be carried in the cable carrier 226 in a high volume rate production system.

The control system is energized which turns on the power to the stepper motor 146 and operates the motor through the motor controller 260 at a preset speed to pull the weld skate 102 through the space between the headers 104. The solenoid valve controlling the air flow through the air lines 190 and 194 is operated to allow air to flow into the manifolds 186 and 188 and from there to the pressure pads 182 and 184. Pressure transducers 290 communicating with the water line 129 may be provided to provide feedback signals to the control system as to the pressure exerted by the weld skate on the wing skin 30, so as to produce a force of about 750 lbs on each skate. Temperature feed back information is provided by a series of thermocouples 250 attached to the underside of the spar cap at regular intervals along the length of the spar. Alternatively, a multi-node thermocouple having insulation which melts at about the same temperature as the thermoplastic in the faying surfaces of the bond line may be used directly in the bond line to give direct temperature feed back to the control system. This multi-node thermocouple system is disclosed in more detail in an application filed by Karl Hansen and Marc Matsen and entitled "Monitoring and Control of the Induction Welding Process". Yet a third technique for measuring temperature in the bond line is disclosed in an application by Clarence D. Lunden entitled "Thermoplastic Induction Welding Temperature Sensor" which uses the temperature co-efficient of resistively and the varying eddy resistance in the susceptor reflected back as a change in the drive coil impedance.

The control system applies electrical power to the coil 210 to energize the coil to produce an alternating magnetic field. However, in this initial pass of the weld skate 102, the applied power is only about 50% of the power applied to the coil when a full weld pass is to be made. The purpose for the low power initial pass of the weld skate is to confirm that the susceptor 38 and the coil 210 on the weld skate 102 are properly aligned, to avoid excessive heating on one edge or the other of the susceptor 38 that could occur in the event of a misalignment, as is discussed in U.S. Pat. No. 5,508,496 of Karl A. Hansen and C. David Lunden entitled "Tailored Susceptors for Induction Thermoplastic Welding", and U.S. Pat. No. 5,508,496 for Karl A. Hansen and Edward Weisberg entitled "Selvaged Susceptor for Thermoplastic Welding by Induction Heating". The alignment determination is made by comparing temperature readings from thermocouples on opposite edges of the spar. If the coil 210 is aligned exactly over the centerline of the susceptor 38, the temperature readings from the thermocouples 250 on both sides of the spar cap 35 will be equal. If the temperature readings on one edge of the spar cap 35 are higher than on the other edge, that means that the coil 210 is not aligned over the centerline of the susceptor 38 and the lateral position of the coil assembly 156 is adjusted toward the low temperature side a small increment. The alignment corrections can be made periodically at each set of thermocouples to refine the alignment of the coil 210 over the susceptor. The alignment position for each susceptor can be recorded in the event that the susceptor was not straight when it was attached to the spar cap, so the coil position can be repeated exactly for each subsequent welding pass over that spar.

When the alignment of the coil 210 over the susceptor is established, the weld skate 102 is returned to the start position for the start of a full power weld pass. The control system is turned on which energizes the motor control and applies power to the stepper motor 146 to drive the driven sprocket 144 through the gear box 147. The driven sprocket 144 drives the idle sprocket 142 through the short chain 143, and the long chain around the idle sprocket 142 pulls the weld skate 102 along the cam grooves 132 and 162 between the pair of headers 104 at a slow enough speed to enable the coil 210 to provide sufficient power to melt the thermoplastic faying surfaces on the spar cap 35 and the underside of the wing skin 30.

The control system energizes the coolant supply module 236 which begins circulating cooling water through the matching network 234 and the induction coil assembly 156. The power supply 232 is turned on to supply power through the matching network 234 to the induction coil 210 which commences generating an alternating magnetic field that propagates vertically through the wing skin 30 and around the susceptor 38 on the top of the spar cap 35. The alternating magnetic field around the susceptor 38 induces eddy currents in the copper mesh of the susceptor which generates heat by dielectric heating and melts the resin encapsulating the susceptor 38 and the resin in the surface layers of the spar cap 35 and the wing skin 30. At a power level of about 400 watts to the coil 210, the stepper motor 146 is operated at a speed which draws the weld skate 102 at a speed of travel of about 1–2 inches per minute through the headers 104 which provides about the best combination of power input and dwell time at temperature to produce good bonding conditions for the Klll-B resin in the bond line.

Figure 13A:
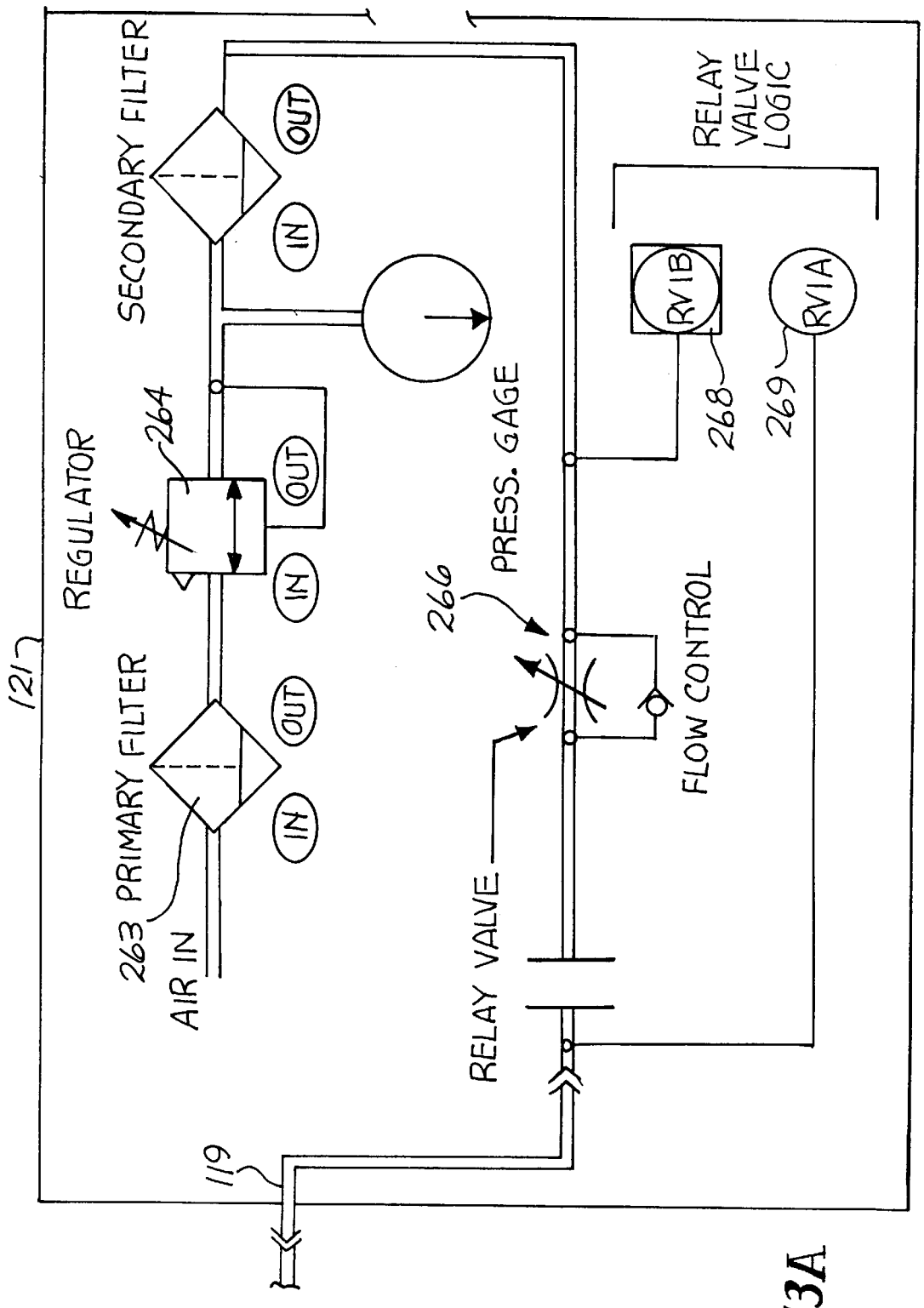
FIG. 13A is a schematic diagram of the control circuit for the air pressure in the air master cylinder shown in FIG. 13.

The control system 228 sets the set point of the regulator 264 in the pad pressure control module 121 and opens a solenoid operated air valve to pressurize the air supply circuit shown in FIG. 13A to supply air under pressure to the cylinder 118 on the upper module 110 of the weld skate 102. The piston 120 in the cylinder 118 drives the piston 126 in the cylinder 128 to pressurize the water line 129, and in turn pressurize the cylinders 166 and 168 to exert force on the pressure pads 182 and 184. The pressure in the air cylinder 118 is adjusted to produce a total force on the two pressure pads 182 and 184 of about 2500 pounds, or 1250 pounds on each pressure pad. The pressure exerted by the pressure pads 182 and 184 is determined empirically as the amount necessary to extrude molten thermoplastic from the bond line, thereby ensuring a flow of the molten thermoplastic in the bond line around the susceptor, which is believed desirable to create a good fusion bond, without exerting excessive force on the spar web.

Air pressure is applied to the air lines 190 and 190' to pressurize the air bearing surfaces 200 in the pressure pads 182 and 184. The air pressure in the air lines 190 and 190' need not be sufficient to completely float the pressure pads off of the wing skin 30, since the air pressure requirement would be more than 200 psi and the volumetric air flow rate would be very great. Instead, the air pressure is about 100 psi which is sufficient to produce substantial air cooling of the wing skin and reduce the frictional drag of the pressure pads 182 and 184 on the wing skin so that the stepper motor 146 can be a much smaller, lower power motor than would be required if no air bearing surfaces were provided on the pressure pads 182 and 184. The force exerted by the piston rods 175 and 176 on the pressure pads 182 and 184 is reacted through the lower skate module frame 150 and the camroll bearings 160 to the headers 104 and thence through the spreader bars 80 and 82 and the lateral tie bars 66 to the lower tooling which supports the under side of the wing box 28.

The thermocouples 250 under the spar cap 35, or the thermocouples in the bond line (if the multinode temperature sensing system is being used), produce signals indicative of the temperature on the two edges of the bond line and these signals are compared by the temperature comparitor 252. The control system 228 interprets the difference in temperature between the two edges of the spar cap as misalignment data and energizes the lateral adjustment system 158 to adjust the lateral position of the coil assembly 156 to center the coil over the susceptor 38 to equalize the temperature on the two sides of the spar cap 35 in the event that the initial low power pass did not ensure exact alignment of the coil 210 over the susceptor 38.

After a single full power weld pass of the weld skate 102 over the first spar, the weld skate is moved to the next pair of headers 104 over the next spar 34. The normal weld process is to perform repeated welding passes of the weld skate over the same bond line in accordance with an invention disclosed in U.S. patent application entitled "Multipass Induction Heating For Thermoplastic Welding" filed by Todd Peterson and Michael Walker, the disclosure of which is incorporated herein by reference. However, because of the hydrophilic nature of the Klll-B thermoplastic used to make the wing box 28 in the preferred embodiment of this process, it is considered advantageous to complete the first welding pass for all of the top spar caps 35 in the assembly as soon as possible to forestall moisture absorption into the surface layers of the spar caps and the faying surfaces of the wing skin 30. Other techniques could be used to forestall moisture absorption, such as by performing the process in a dry environment, using thermoplastic material that is not hydrophilic, or sealing the faying surfaces after the drying process against absorption of moisture into the surfaces layers of the material. Use of these techniques would make it possible to perform all of the welding passes in immediate sequence following the first pass without first performing an initial weld pass on all of the spars before completing the multiple passes in accordance with the Peterson and Walker multipass process referred to above. Naturally, the use of multiple weld skates 102 would facilitate the speedy welding of the wing box 28, and would be preferred in a high volume production environment.

After all the spars 34 have been welded to the wing skin 30, the FAJ 40 is rotated to its horizontal position with the upper skin 30 on top. The upper support beams 107 and the headers 104 are removed, and pairs of rib headers 300, only one of which is shown in FIG. 24, are mounted on pairs of lateral spreader bars 302 inserted into slots in the longitudinal tube members 45 and 45' using structure that is identical to the corresponding structure by which the headers 104 are mounted to the spreader bars 108 and 109. A support beam (not shown) may be laid over the top of the rib headers 300 spanning the longitudinal length of the FAJ 40, and may be fastened at its ends to end tie bars secured to the block support beams 73 at the opposite ends of the box frame 42 to provide vertical support of the headers 300 against the vertical forces exerted by the weld skate 102. In the preferred embodiment, however, the rib headers 300 are short enough that there is no need for intermediate support and the end connections are all the support that is required.

The weld skate 102 is loaded between the headers 300 and the motor module 134 is connected to the ends of the headers 300 and coupled by the chain 138 to the frame 116 of the upper module 110 of the skate 102. A low power pass of the weld skate 102 is performed over the ribs to confirm alignment of the coil 210 over the susceptors 38 on the rib caps 37. After the alignment is confirmed or the lateral position of the coil is adjusted to align it over the susceptor 38 as described above, a high power pass of the weld skate 102 is performed to weld the rib caps 37 and the wing skin 30 together. The coil used on the welding of the ribs is an asymmetric coil as described in U.S. Pat. No. 5,444,220 filed by Karl Hansen and Edward Weisberg entitled "Asymmetric Induction Work Coil for Thermoplastic Welding" the disclosure of which is incorporated by reference. The magnetic field generated by the asymmetric coil can be precisely focused to avoid reheating the susceptor 38 on the spar caps 35 where it intercepts the susceptors over the rib caps 37. The magnetic field acting at the edge of the spar cap otherwise could cause excessive localized heating of the edge of the spar susceptor and thereby possibly damage the integrity of the previously welded spar cap bond line, as is more completely described in the application.

With a first weld pass completed for an initial welding of the spar caps and rib caps to the wing skin 30, the support beam 304 and the rib headers 300 are removed and replaced with the spar headers 104 and the support beams 107 for repeat passes of the weld skate over the spar caps to improve the continuity and decrease the thickness of the bond line, as described in the previously mentioned U.S. Pat. No. 5,486,684 entitled "Multipass Induction Heating for Thermoplastic Welding" after the additional weld passes have been accomplished, nominally three additional passes for each spar, the headers 104 and the support beam 107 are again removed and replaced with the rib headers and rib support beams and the multiple weld passes are performed on the rib line.

On completion of the three additional weld passes for each spar and each rib, the support beams 304 and the headers 300 are removed and a non-destructive inspection is conducted for all welded bond lines. The inspection is a non-destructive inspection of embedded inaccessible bond lines using an ultra sonic imager, which may be used in conjunction with a variable frequency shaker apparatus connected to the top wing skin by suction to cause unwelded areas of the bond line to separate under cyclic separating forces exerted on the suction attachment to the wing skin opened minute space in the unbonded regions of the bond line which enables the unbonded regions to be detected by the ultra sonic imaging system. After the non-destructive inspection mapping of the welded bond lines on the upper wing skin are completed, the test results are evaluated and any unbonded regions in the bond lines are rewelded using the same weld skate and tooling and the process described above, and those areas are re-tested after additional weld passes are accomplished to confirm that the fusion bond is continuous throughout the bond line over the entire surface of the spar caps and rib caps.

After the upper wing skin is completely welded to the spars and ribs and the bond lines have all been tested for weld continuity, the upper spar headers 104 and the support beams 107 are reinstalled on the FAJ 40, and the FAJ is rotated 180° to position the lower dummy wing skin on top. The lower headers 106 and the lower support beams 107' are removed and the dummy lower wing skin 32' is removed. A pair of headers (not shown) is installed on the FAJ 40 between the ends of the spreader bars 80 and 82 and a profilometer is mounted on the headers and is drawn along the lower spar caps 35' by the motor module 134. The profilometer can be a commercially available laser scanning device sold by HiScan Corporation. The longitudinal position of the scanning profilometer is determined and correlated with the signals from the HiScan profilometer by an "Integrated Laser Digitizing and Tracking System" invented by Jeffrey Hansen, Fredrick Rudnick and Charles Richards. It uses a laser tracking system having a retroreflective target mounted next to the laser scanning profilometer to allow tracking of the profilometer head independently of the motive device for driving the profilometer head longitudinally along the headers. The signals from the profilometer are correlated with the tracking system signals to provide a digitized profile over the entire length of the spar cap and the underside of the wing skin 32. The profile of the lower spar caps 35' is recorded in the recorder of the control system 228. All of the lower spar caps 35' are examined with the profilometer 312 in the same manner and the profiles of each spar cap 35' are recorded in the control system recorder. After the spar profiles are recorded, the profilometer headers 310 are removed and can be replaced with rib headers 314, and the profilometer 312 is drawn over the lower rib caps 37' to obtain a measurement of the profile of the lower rib caps 37' in the same manner as was done for the lower spar caps 35'. The profilometer dataset is translated into digital product definition record for the spars and the ribs to provide a digitized composite profile for each of the spars that can be compared with a corresponding digitized profile of the lower wing skin, as described below.

The lower wing skin 32 is removed from the oven or other low humidity storage where it is protected from exposure to airborne moisture and is loaded in a fixture (not shown) in which the profilometer can be drawn over the faying surfaces which will be welded to the spar caps and the rib caps. Those faying surfaces have a pad-up area of thermoplastic composite material which can be machined to correspond to the profiles recorded on each of the spar caps 35' and lower rib caps 36'. The faying surfaces of the inner mold line of the lower wing skin 32 are scanned with the profilometer and the scanned data is recorded in the control system 228. That data is translated onto the digital product definition of the wing skin and the profiles of the faying surfaces of the wing skin 32 and the spar caps 35' and the rib caps 37' are compared to produce a best fit profile for the wing skin which can be achieved without cutting through the pad up areas on the faying surfaces. The lower wing skin 32 is machined to produce the best fit up of the faying surfaces on the inner mold line of the lower wing skin 32 to the spar caps 35' and 37, and a ribbon on thermoplastic material is attached to the machined pad-up or to the top of the susceptor 38 on the spar cap 35', to give a band of excess resin that can be melted, fill all the slight imperfections remaining between the spar cap 35' and the lower wing skin 32, and the remainder be squeezed out in a mixing flow that is believed to promote intimate mixing and fusion of the thermoplastic material at the faying surfaces.

The wing skin 32 is loaded on to the welded assembly and indexed to the lower panel support brackets 68. The lower spar headers 106 are mounted on the lower spar support blocks 75 in alignment on either side of the pad ups on the lower wing skin 32, and the lower support beams 107 are laid across the flat outer surface of the lower spar headers 106 and are fastened to the lateral tie bars 66 in the same manner as was done for upper wing skin. The module 134 is connected to the lower spar headers 106 at one end and the sprocket module 136 is attached to the other end of the spar headers 106. A weld skate 102 is inserted between the lower spar headers 106 in the cam grooves 132 and 162 and is connected to the chain 138. The stepper motor 146 in the module 134 is energized to begin drawing the skate along the lower wing skin over the spar 34. The air to the cylinder 118 is turned on by the control system 228 and is maintained by the pressure control 121 to maintain the set pressure for the pressure pads 182 and 814 on the weld skate 102. The power to the coil 210 is energized from the power supply through the matching network 234 and the coolant supply 236 is turned on to cool the coil and the matching network 234. The same process described for the upper wing skin is performed in which an initial weld is made over all of the lower spar caps 35' and lower rib caps 37' to seal against moisture absorption from the air.

A heater blanket is applied over all of the lower spar caps 35' and lower rib caps 37' and is left in place at a time and temperature sufficient to dry the material in the spar and rib caps sufficient to prevent delamination when the lower wing skin is welded to the spars and ribs. A suitable drying schedule that adequately dries the material for this purpose is twenty-four hours at 180° at the surface of the spar caps and rib caps. Other drying schedules could be found for adequately drying the material and no effort was made to exhaustively discover the most efficient drying schedule for this purpose. Obviously, the use of materials that do not absorb moisture from the air as does the Klll-B material, would obviate the drying step. Other techniques to prevent the absorption of moisture from the air would also make the drying step unnecessary, as described above.

After the lower wing skin 32 has been welded and then multiply re-welded as described above to the lower spar caps 35' and the lower rib caps 37', the entire bond line at the lower wing skin 32 is tested for continuity as described above. The positions of regions having incomplete welds, if any, are recorded in the recorder of the control system 228 and the wing box 28 is reinstalled in the FAJ 40 and those incomplete or suspect areas are re-welded and then retested. The occurrence of incomplete welds decreases dramatically as testing of the completed wing box and comparison with the records of stored in the control system recorder are correlated so that destructive inspection of test articles in correlation with the conditions of welding at incomplete or weak weld regions makes possible the optimization of the welding parameters throughout the system in the production system improves the uniformity of the weld and eliminates regions in which the fusion bond is incomplete or weak.

Obviously, numerous modifications and variations of the disclosed preferred embodiment will occur to those skilled in the art in light of this description of a preferred embodiment. Accordingly, it is expressly to be understood that these modification and variations, and the equivalence thereof, made be practiced while remaining within the spirit and scope of the invention as set forth in the appended claims, wherein

I claim:

1. An articulated skate for welding by fusion bonding two parts having thermoplastic faying surfaces, comprising:

a skate frame having laterally projecting bearings mounted thereon for engaging tooling surfaces of tooling supported adjacent said parts for guiding said skate and for reacting forces exerted by said skate against said parts;

an attachment for connecting a motive system to said skate frame whereby said skate frame may be moved at a controlled speed along said tooling;

an induction work coil mounted centrally on said skate frame for generating a magnetic field into said parts and heating with induced eddy currents a susceptor located between said faying surfaces; and two pressure pads mounted on said frame on either side of said coil, said pads having air bearing surfaces for transferring pressure from said frame against said parts through a thin film of pressurized air conveyed from a source of air pressure through said pressure pads to said air bearing surfaces.

2. An articulated skate as defined in claim 1, further comprising:

a swivel joint connecting each of said pressure pads to said frame for enabling said pressure pads to follow a contoured surface while maintaining said air bearing surfaces flat against the surface of said parts.

3. An articulated skate as defined in claim 2, further comprising:

flexible air lines connecting said pressure pads to a source of air pressure, and internal air passages connecting said air lines to said air bearing surfaces, enabling said pressure pads to swivel on said swivel joint while said air bearing surfaces remain connected to said source of air pressure.

4. An articulated skate as defined in claim 2, further comprising:

a fluid piston mounted in a cylinder on said frame aligned with each of said swivel joints;

said swivel joints mounted on an end of each of said pistons for exerting constant pressure on said pressure pads despite variations in said part contour and variations in said tooling surfaces guiding said frame.

5. An articulated skate as defined in claim 4, wherein:

said fluid cylinders are hydraulic cylinders having water lines connected thereto for conveying water under pressure to said cylinders, said water lines extending from said cylinders to a source of water under pressure.

6. An articulated skate as defined in claim 5, wherein:

said source of constant water pressure includes a master water cylinder pressurized by air controlled by an air pressure control system.

7. An articulated skate as defined in claim 6, further comprising:

a second frame having a second set of projecting bearings thereon for engaging a second set of surfaces on said tooling;

a link extending between said second frame and said first frame for establishing a pivotable mechanical connection between said frames, whereby longitudinal motion of one of said frames under control of said motive system causes corresponding motion of the other of said frames;

said master water cylinder being mounted on said second frame.

8. An articulated skate as defined in claim 6, further comprising:

mounting structure for mounting said work coil on said first frame, said mounting structure having lateral guides for permitting lateral motion of said coil on said frame;

an adjustment mechanism mounted on said first frame and operatively connected to said work coil for adjusting the lateral position of said work coil on said frame.

9. An articulated skate as defined in claim 8, wherein:

said adjustment mechanism includes an actuator responsive to signals from a susceptor position system for determining any off-set of said susceptor from alignment under said work coil, whereby said actuator is energized in response to off-set signals from said susceptor position system to realign said work coil over said susceptor.

* * * * *